United States Patent [19]

Mertins et al.

[11] Patent Number: 5,847,389
[45] Date of Patent: Dec. 8, 1998

[54] SEED MONITORING SYSTEM FOR COUNTING SEEDS AS THEY ARE DISPENSED THROUGH SEED TUBES IN AN AIR SEEDING SYSTEM

[75] Inventors: Karl-Heinz O. Mertins, Fargo; Barry D. Batcheller, West Fargo; Douglas L. Hauck, Fargo, all of N. Dak.; Christopher J. Skarie, Audubon, Minn.; Jon T. Jacobson, Fargo, N. Dak.

[73] Assignee: Phoenix International Corporation, Fargo, N. Dak.

[21] Appl. No.: 645,350

[22] Filed: May 13, 1996

Related U.S. Application Data

[63] Continuation-in-part of Ser. No. 44,247, May 15, 1995, Pat. No. 5,650,609.

[51] Int. Cl.[6] ................................................ G01V 9/04
[52] U.S. Cl. .................................. 250/222.2; 250/223 R; 377/6; 21/174
[58] Field of Search ............................. 250/222.2, 223 R, 250/227.11, 227.21, 574, 222.1, 239; 377/6–9, 28–29, 53; 221/185.3, 211, 254, 71, 233, 9, 2.5, 2, 174

[56] References Cited

U.S. PATENT DOCUMENTS

| | | |
|---|---|---|
| Re. 30,539 | 3/1981 | van der Lely . |
| 2,557,186 | 6/1951 | Hamacher . |
| 2,654,879 | 10/1953 | Jackson . |
| 2,803,756 | 8/1957 | Cox . |
| 3,018,440 | 1/1962 | Cumings . |
| 3,120,125 | 2/1964 | Vasel ..................................... 250/903 |
| 3,197,068 | 7/1965 | Corbin et al. . |
| 3,317,680 | 5/1967 | Porter . |
| 3,370,285 | 2/1968 | Cruse et al. . |
| 3,422,776 | 1/1969 | Gregory, Jr. . |
| 3,456,155 | 7/1969 | Buchanan . |
| 3,469,157 | 9/1969 | Rhodes . |
| 3,511,411 | 5/1970 | Weiss . |
| 3,527,928 | 9/1970 | Ryder et al. . |
| 3,537,091 | 10/1970 | Schenkenberg . |
| 3,648,054 | 3/1972 | Nance . |
| 3,648,631 | 3/1972 | Fiedler et al. . |
| 3,723,989 | 3/1973 | Fathauer et al. ..................... 250/222.2 |
| 3,813,540 | 5/1974 | Albrecht ................................. 250/206 |
| 3,828,173 | 8/1974 | Knepler ................................. 250/239 |
| 3,855,953 | 12/1974 | Fathauer et al. . |
| 3,861,337 | 1/1975 | Thompson . |
| 3,881,631 | 5/1975 | Loesch et al. . |

(List continued on next page.)

OTHER PUBLICATIONS

Reid, W. S. "Seed Counters Aid Research," *Can. Agric.*, 19(1) pp. 24–27, Jan. (1974).

Carlow, C. A. et al. "An Electronic Seed Counter and Group Number Discriminator," *Journal of Agricultural Engineering Research*, 6:2, pp. 130–136, Jan. (1961).

Dudley, J. W. et al. Inheritance of Branched Inflorescence and Vestigial Flower in Alfafa, *Medicago sativa*, L., *Agronomy Journal*, 48:2, pp. 91–92, Jan. 1956.

Reid, W. S. et al. "A Photoelectric Seed Counting Detector," *J. Agric. Engng. Res.* 21 pp. 213–215, Jan. 1976.

Reid, W.S. et al. "A Laser Light Source Seed Counter," *J. agric. Engng Res.*. 19, pp. 265–269, Jan. 1974.

*Primary Examiner*—Que Le
*Attorney, Agent, or Firm*—Harness, Dickey & Pierce, P.L.C.

[57] ABSTRACT

An optical seed flow monitoring system for monitoring seed flow through the primary and secondary seed tubes in an air seeding system. The primary seed tubes include a primary seed sensor having a plurality of emitter lens bodies and receiver lens bodies. Optical fibers connect the emitter lens body to an optical beam generating device and the receiver lens body to an optical beam detecting device both positioned remotely from the seed tubes. Alternately, one or more of the secondary seed tubes can include a secondary seed sensor having an emitter lens body and a receiver lens body.

24 Claims, 16 Drawing Sheets

U.S. PATENT DOCUMENTS

| | | |
|---|---|---|
| 3,890,221 | 6/1975 | Muehlethaler . |
| 3,974,337 | 8/1976 | Tatsuzawa . |
| 3,974,377 | 8/1976 | Steffen . |
| 3,989,311 | 11/1976 | De brey . |
| 4,008,826 | 2/1977 | Carree . |
| 4,023,507 | 5/1977 | van der Lely . |
| 4,042,114 | 8/1977 | Arild et al. ................... 209/111.7 R |
| 4,054,779 | 10/1977 | Wilke . |
| 4,054,799 | 10/1977 | Wolfe et al. ........................ 250/483.1 |
| 4,096,424 | 6/1978 | Hysler ................ 250/223 R |
| 4,109,824 | 8/1978 | Davis ......................... 221/7 |
| 4,145,980 | 3/1979 | Boots . |
| 4,150,286 | 4/1979 | Toll et al. .......................... 250/223 R |
| 4,163,507 | 8/1979 | Bell ............................. 221/2 |
| 4,166,948 | 9/1979 | Steffen ............................. 250/223 R |
| 4,176,721 | 12/1979 | Poggemiller et al. . |
| 4,185,224 | 1/1980 | Thompson . |
| 4,193,356 | 3/1980 | Vehe et al. .................. 221/7 |
| 4,209,109 | 6/1980 | Curl et al. . |
| 4,238,790 | 12/1980 | Balogh et al. . |
| 4,246,469 | 1/1981 | Merlo . |
| 4,307,390 | 12/1981 | Steffen et al. . |
| 4,413,685 | 11/1983 | Gremelspacher et al. . |
| 4,432,675 | 2/1984 | Machnee ................................ 221/278 |
| 4,534,651 | 8/1985 | Minikane ......................... 250/227.11 |
| 4,555,624 | 11/1985 | Steffen ............................... 250/223 R |
| 4,634,855 | 1/1987 | Friend et al. ....................... 250/222.1 |
| 4,646,941 | 3/1987 | Grosse-Scharmann et al. ......... 222/23 |
| 4,697,173 | 9/1987 | Stokes . |
| 4,710,757 | 12/1987 | Haase . |
| 4,827,143 | 5/1989 | Munakata et al. ..................... 250/574 |
| 4,834,004 | 5/1989 | Butuk et al. . |
| 4,892,157 | 1/1990 | Gemar . |
| 4,994,666 | 2/1991 | Higgison et al. .................... 250/222.2 |
| 5,090,791 | 2/1992 | Kidder et al. ..................... 250/227.11 |
| 5,170,730 | 12/1992 | Swallow . |
| 5,220,876 | 6/1993 | Monson et al. . |
| 5,301,848 | 4/1994 | Conrad et al. .......................... 222/613 |

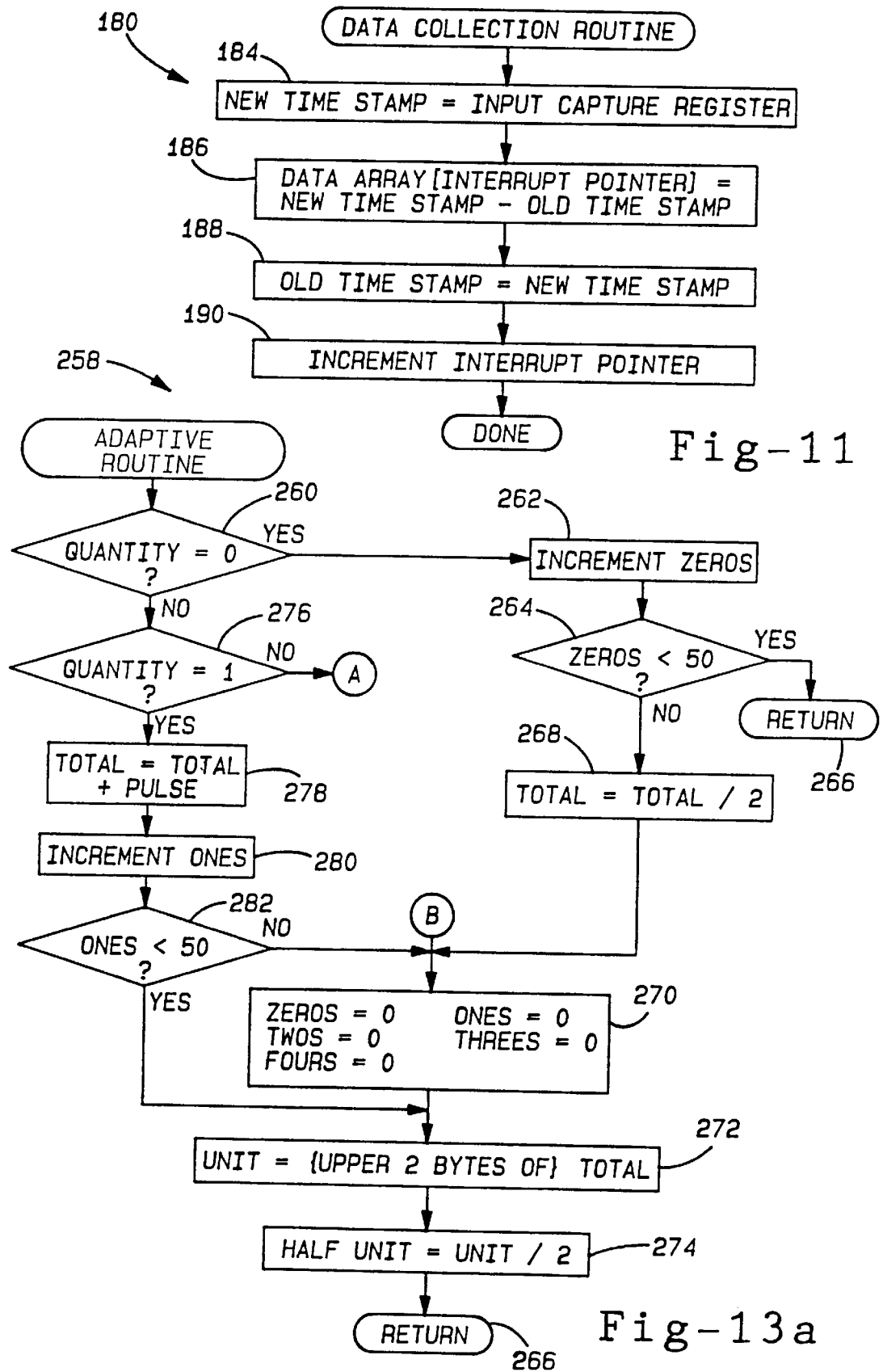

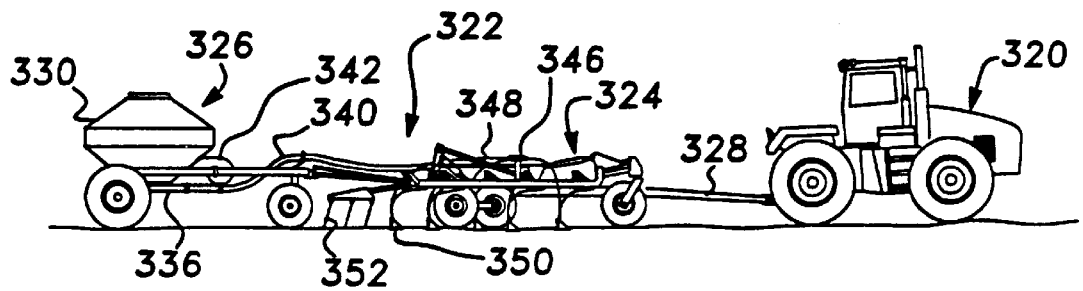
Fig-14
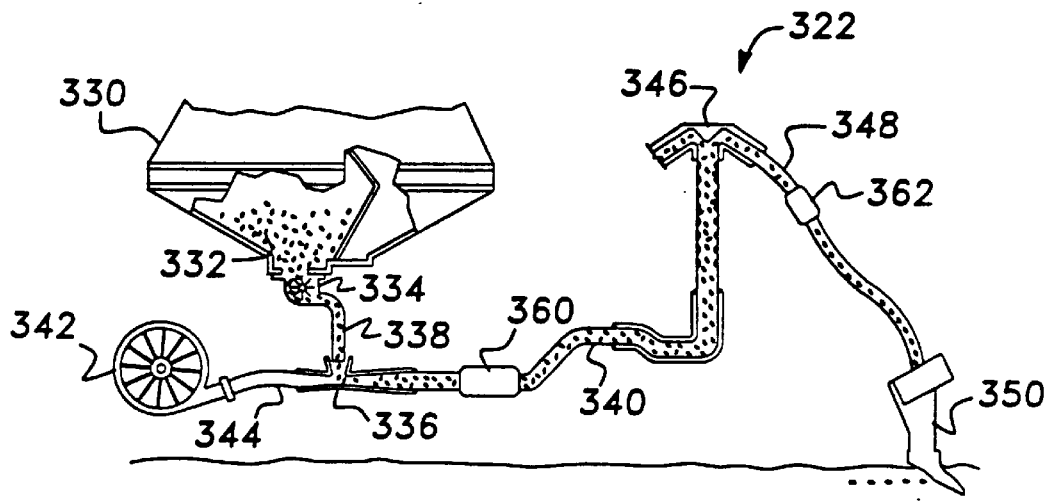
Fig-15
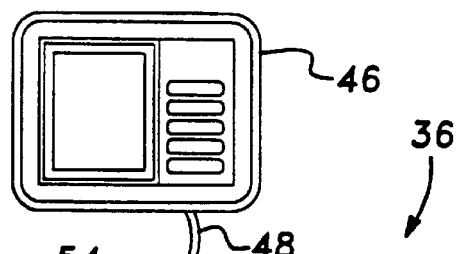
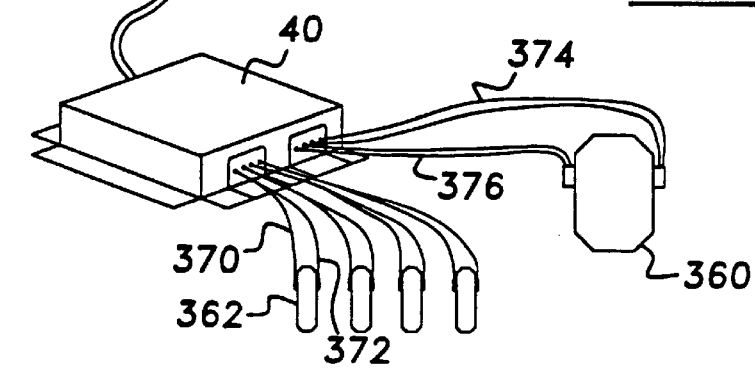
Fig-16

SEED MONITORING SYSTEM FOR COUNTING SEEDS AS THEY ARE DISPENSED THROUGH SEED TUBES IN AN AIR SEEDING SYSTEM

CROSS-REFERENCE TO RELATED APPLICATION

This application is a continuation-in-part application of U.S. application Ser. No. 08/441,247 filed May 15, 1995, now U.S. Pat. No. 5,650,609.

BACKGROUND OF THE INVENTION

1. Field of the Invention

This invention relates generally to a discrete particle counter and, more particularly, to a seed monitor for counting the flow of seeds dispensed by an air seeding system through a plurality of primary seed tubes and secondary seed tubes, where the seed monitor includes an optical sensor attached to one or more of the seed tubes and one or more electro-optical controllers remotely connected to a group of sensors by optical fibers.

2. Discussion of the Related Art

As is well understood, it is important to monitor the quantity of seeds that are being planted into a planting row, especially in a high capacity agricultural environment such as a farm where the seeds are corn seeds, soy bean seeds and the like. Planting too many seeds causes the resulting plant product to be too closely spaced together to allow for proper plant growth, thus affecting the crop yield. Planting too few seeds reduces the effective use of the planting area. For high output planting, industrial seed planters have been devised to plant a high volume of seeds relatively quickly. To ensure that the proper number of seeds are planted by the seed planters, a seed monitoring system is generally provided that counts the seeds as they are dispensed through seed tubes associated with the planter. A typical seed planter will have many seed tubes for planting a multitude of planting rows simultaneously.

One type of seed monitoring system incorporates optical devices that generate an optical beam directed across the seed tubes, and optical sensors that are sensitive to the loss of light intensity caused by seeds interfering with the optical beam. An electrical counting circuit monitors the occurrences of loss of light intensity to provide a count of the seeds. Various optical seed monitoring systems of this type are disclosed in U.S. Pat. No. 3,974,377 issued to Steffen; U.S. Pat. No. 4,555,624 issued to Steffen et al.; and U.S. Pat. No. 4,163,507 issued to Bell.

These, as well as other, optical seed monitoring systems have been inaccurate for various reasons. One inaccuracy results from the spatial nonuniformity of the optical beam that senses the seeds. Because of spatial nonuniformity, the intensity of optical rays generated by the optical devices vary depending upon the location within the optical beam. Therefore, the ability of the optical sensor to detect the interruption of the optical beam by the seeds varies depending on the location of the seeds within the beam. Consequently, the optical sensor may not adequately detect seeds being dropped through certain locations in the seed chute.

One prior art seed monitoring system has attempted to address spatial nonuniformity of the optical beam of a seed sensor by proposing an optical device that generates a trapezoidal cross-section of an optical beam. However, the trapezoidal cross-section creates an undesirable spatial restriction for groups of seeds as they are dropped through the seed tube. U.S. Pat. No. 4,634,855 issued to Friend et al. also discloses an attempt to create an optical beam of high uniformity. However, this proposed solution is of such complexity that the feasibility for commercial success is limited.

Another drawback of the known optical seed monitoring systems is attributable to the environment in which the optical sensors are operating. Because the seed planters encounter dirt, dust and various chemicals during the planting process that may accumulate in the seed tubes, the sensors may be adversely affected because of contamination of the optical components. This situation is further exasperated in those types of optical sensors in which the optoelectronic components and/or electronic circuits of the sensor are located at or attached to the seed tubes. Other problems arise by attempting to protect the circuits and associated wire harness connectors from the corrosive effects due to a combination of moisture and the environmental elements.

Another drawback of the known optical seed monitoring systems occurs when the seed sensors are associated with circuitry that counts pulses when the optical beam is interrupted by the seeds. This may result in a count inaccuracy because a plurality of seeds may simultaneously traverse the optical beam and be counted as a single seed. A related problem is that the accuracy of the known optical seed monitoring systems tend to deteriorate with increasing planting speed, with higher seed populations per acre, and with small grains and seeds. These optical systems may be incapable of sufficiently rapid response to reliably count each seed.

Another type of high volume seed planter, generally referred to as an air seeding system, is also used to dispense seeds. Typical air seeding systems include a tank or hopper that holds a quantity of seeds, fertilizer, herbicides or other appropriate particulate material that is to be evenly dispensed over a field area. A series of primary seed supply tubes are connected to the hopper through a seed metering system, and a series of secondary seed supply tubes are connected to the primary tubes through a manifold to deliver the seeds to desirable locations on the seeding system where they can be dispensed into the ground. A fan forces air through the supply tubes to provide the mechanism for delivering the seeds from the hopper to the dispensing location.

The air seeding system offers a number of advantages over the traditional seed planting system. For example, air seeding systems generally have a higher productivity in that the system allows many more rows to be simultaneously planted than the traditional seed planting system. Therefore, more acreage can be seeded at a much faster rate. Additionally, the air seeding system has a high ground clearance so that the ground does not need to be tilled or plowed prior to being planted by the air seeding system, as was necessary with the conventional seed planter. This eliminates labor, and reduces the affects of wind and water erosion.

A number of problems can occur with air seeding systems that prevent them from dispensing the seeds in a desirable manner. For example, the seed supply tubes can become disconnected, thus preventing seeds from being dispensed through the tubes. Additionally, seeds may collect within the supply tubes and cause a partial or complete blockage of the tubes, also affecting the flow of seeds through the tubes. Also, soil can enter the seed tubes at a point where the seeds are dispensed into the ground, which also may cause the seed tubes to become blocked, and thus prevent the appropriate number of seeds from being dispensed.

Currently available seed planter monitoring systems could be adapted for use in the known air seeding systems to monitor seed flow. However, due to such a high number of seed tubes in the air seeding system as compared with the conventional seed planter systems, this solution is generally too costly. Also, conventional seed monitoring systems would be limited to be used in the secondary seed tubes, and would not be applicable to being used in the primary seed tubes. This is because the larger cross-section of the primary seed tubes cannot be adequately covered with the existing seed sensor technology available for seed planters. Therefore, it is common practice in the industry to equip only a small number of the secondary seed tubes with seed planter type sensors, which leaves a majority of seed tubes without a mechanism for monitoring seed flow.

U.S. Pat. No. 5,177,470 issued to Repas discloses a sensor device for detecting the flow of particles in an air stream that has particular use for detecting seeds in an air seeding system. This patent discloses use of a piezoelectric sensor that extends into the seed tubes. The sensor produces high frequency signals when struck by seeds flowing through the seed tubes that gives an indication of the flow of seeds through the tube. A calibration system is included, so that if the seed tube becomes blocked or partially blocked, the sensor will give an indication of this blockage in a relatively short period of time.

Although different seed monitoring systems are available for monitoring seed flow in an air seeder, there is a wide area for improvements in these monitoring systems that will allow the monitoring of seed flow, including seed counting, through all of the secondary seed tubes in a cost effective manner. Further, no prior art air seeding system has attempted to monitor seed flow and count seeds at the primary seed tubes of the air seeder. It is therefore an object of the present invention to provide such an air seeder monitoring system that counts seeds and monitors seed flow at the primary and/or secondary seed tubes of an air seeder.

SUMMARY OF THE INVENTION

In accordance with the teachings of the present invention, a seed monitoring system for monitoring seed flow and accurately counting seeds in an air seeding system is disclosed. The seed monitoring system has a particular use for counting seeds that are dispensed through a plurality of primary seed tubes. In one embodiment, each primary seed tube includes an optical sensor having at least one emitter lens body and at least one receiver lens body. The emitter lens body and the receiver lens body include one or more lenses, that may be cylindrical, spherical or aspherical, and folding optics. The diameter of the primary seed tubes determines the number of emitter lens bodies and receiver lens bodies that are needed. Each of the primary seed tubes feeds a plurality of secondary seed tubes through secondary manifolds. In an alternate embodiment, each of the secondary seed tubes can be equipped with an optical sensor having an emitter lens body and a receiver lens body of the type mentioned above.

Each emitter lens body is remotely connected to a beam generating device by an emitter optical fiber and each receiver lens body is remotely connected to a detecting device by a receiver optical fiber. Specialized algorithms are used to determine the flow of seeds being dispensed through the seed tubes based on the light transmitted through the seed tubes from the emitter lens body to the receiver lens body. The optical components of the emitter lens body generates a substantially collimated, spatially uniform beam across the entire width of the sensing area within the seed tube, which allows the accurate detection of seeds anywhere within the sensing area.

Additional objects, advantages and features of the present invention will become apparent from the following description and appended claims, taken in conjunction with the accompanying drawings.

BRIEF DESCRIPTION OF THE DRAWINGS

FIG. 11 is a flow chart diagram of a data collection routine of the seed monitor system according to the invention;

FIGS. 13A and 13B are flow chart diagrams of an adaptive algorithm of the seed monitor system according to the invention.

FIG. 14 is a side view of a tractor towing an air seeding system including a seed monitoring system according to an embodiment of the present invention;

FIG. 15 is a cut-away side plan view of the seed monitoring system of the invention in association with the air seeding system;

FIG. 16 is a general overview depicting the air seed monitoring system of the present invention separated from the air seeding system of FIG. 1;

DETAILED DESCRIPTION OF THE PREFERRED EMBODIMENTS

The following description of the preferred embodiments directed to an optical seed monitoring system is merely exemplary in nature, and is in no way intended to limit the invention or its applications or uses.

Figure 1:
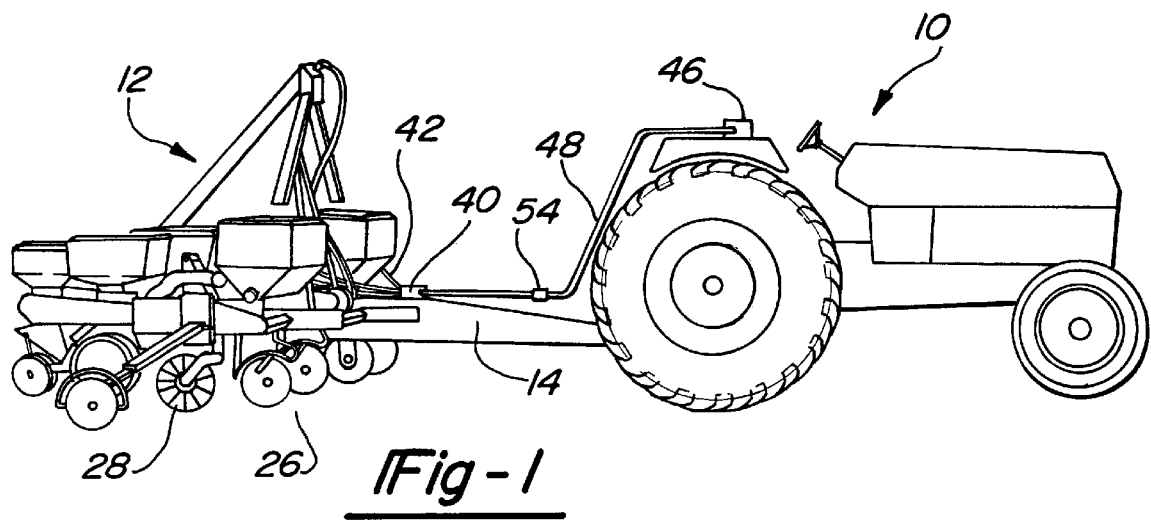
FIG. 1 is a side view of a tractor towing a seed planter including a seed monitoring system according to an embodiment of the present invention.

FIG. 1 shows a side view of a tractor 10 intended to represent various types of farm tractors that perform various tasks in a high volume agricultural environment as would be present on a farm. In the depiction of FIG. 1, the tractor 10 is towing a multiple row seed planter 12 by a tow bar 14. The seed planter 12 creates multiple parallel furrows in the soil of a field area (not shown) to be planted, dispenses a controlled quantity of spaced apart seeds into the furrows, and then covers the furrows in a manner that allows the seeds to germinate and become plants. The seed planter 12 is intended to represent various known types of seed planters that are capable of planting many rows of seeds simultaneously. Known seed planters of the type of the seed planter 12 can simultaneously plant more than twenty-four parallel configured rows of crops. As will be appreciated by those skilled in the art, the seed planter 12 can further represent many other types of seed planters including those that can be mounted to a rear or front hitch of the tractor 10 in either a 3-point or semi-mounted (2-point) configuration, as well as certain types of air seeding systems.

Figure 2:
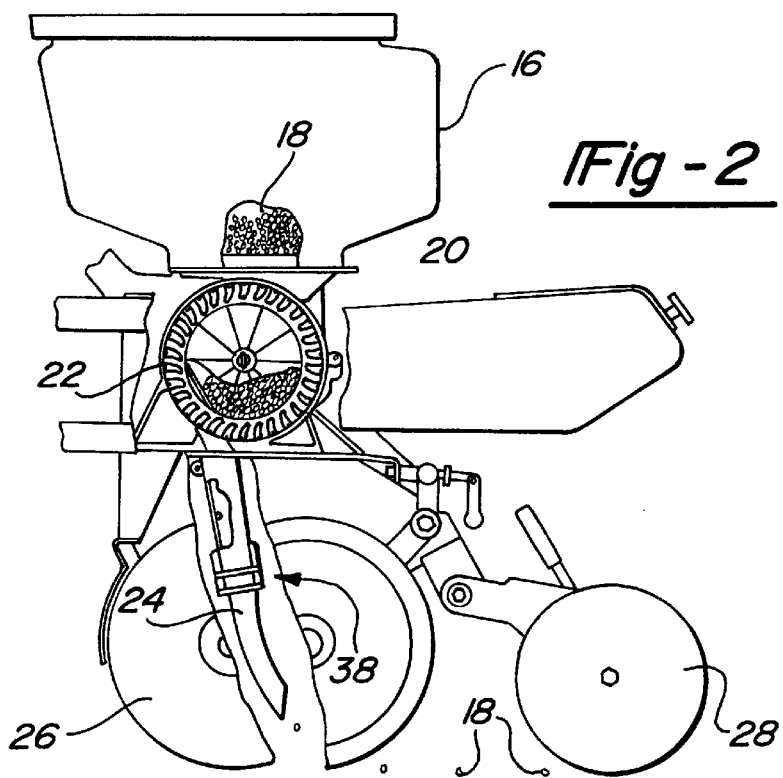
FIG. 2 is a cut-away sectional view of the seed planter of FIG. 1 showing a seed tube dispensing seed.

FIG. 2 shows a cut-away side view of a portion of the seed planter 12. The seed planter 12 includes a hopper 16 that stores a quantity of seeds 18 to be planted. The seeds 18 are loaded into a rotary mechanism 20 from the hopper 16. The rotary mechanism 20 includes a series of equally spaced cavities 22 circumferentially positioned around the mechanism 20 so as to selectively dispense the seeds 18 into a seed tube 24. An assembly of disc openers 26 rotate as the seed planter 12 is towed by the tractor 10 to create the furrows in the plant area. As the seeds 18 are dispensed into the furrows, a closing wheel assembly 28 covers the furrows with dirt. The rotation of the mechanism 20 is geared to the rotation of ground drive wheel assemblies (not shown) such that the seeds 18 are dispensed into the furrows at a rate that depends on the towed rate of the seed planter 12.

Figure 3:
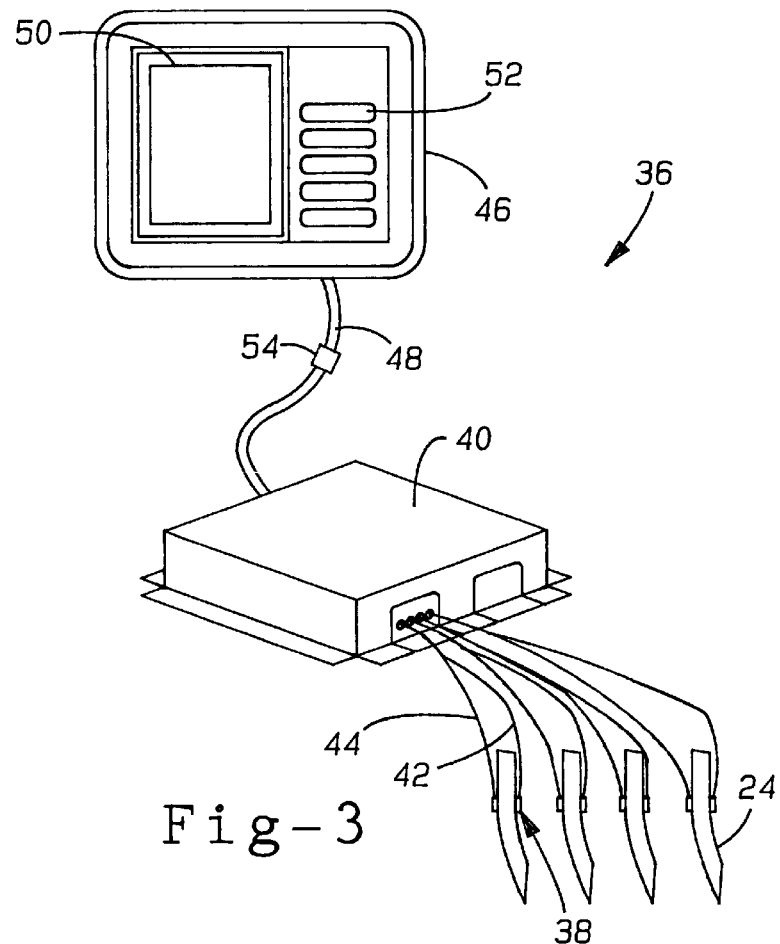
FIG. 3 is a general overview depicting the seed monitoring system of the present invention separated from the tractor and seed planter of FIG. 1.

A seed monitoring system 36, according to an embodiment of the present invention, is used in association with the seed planter 12 to count the seeds 18 that are dispensed into the seed tubes 24 so as to ensure that the proper number of seeds 18 are being planted to avoid under planting and over planting. The seed monitoring system 36 is shown separated from the tractor 10 and the seed planter 12 in FIG. 3. Four seed tubes 24 are shown in the depiction in FIG. 3, however, it will be appreciated by those skilled in the art that the number of seed tubes 24 can vary depending on the particular seed planter 12 being used. As will be discussed in greater detail below, the seed monitoring system 36 includes a sensor 38 that emits an optical beam across the seed tube 24 so that as the seeds 18 are dropped through the seed tube 24, they interfere with the optical beam to cause a change in optical intensity of the beam that is indicative of the size and quantity of the seeds 18. A signal processing unit (SPU) 40 is positioned remote from the seed tubes 24 and the sensors 38.

A transmitting optical fiber 42 and a detecting optical fiber 44 are connected to the SPU 40 and to the sensors 38. In one embodiment, the optical fibers 42 and 44 are plastic, single cable, multimode optical fibers. Plastic optical fibers have been selected over glass optical fibers because of a number of advantages. These advantages include high flexibility, easy cutting and termination, and low cost. Single cable optical fibers have been selected over optical fiber bundles for simplicity and low cost reasons. A typical optical fiber of the type described herein will include a core region, a cladding region surrounding the core region and an outer jacket material. The cladding region has a slightly lower index of refraction than the core region such that light rays that are emitted into the core region at or below a maximum angle will be substantially reflected at the core/cladding barrier so as to propagate down the fiber. In one specific embodiment, the plastic material of the core and cladding region is polymethylmethacrylate (PMMA) and the outer jacket material is a black polyethylene. Optical fibers of this type are available from AMP Incorporated, Harrisburg, Pa. as part nos. 501232-5 and 501336-1. However, as would be appreciated by one skilled in the art, different plastics could also be used for the optical fiber, as well as glass fibers without departing from the scope of the invention.

An operator terminal 46 receives signals from the SPU 40 over a cable 48. The operator terminal 46 includes a display screen 50 and a series of control switches 52. The operator terminal 50 offers a flexibility in the system 36 that can be tailored to accommodate a variety of different applications. Particularly, the display screen 50 can be a custom liquid crystal display (LCD) and the switches 52 can be hard-key switches for manual operator inputs. Also, the screen 50 can be a dot-matrix LCD and the switches 52 can be separated into hard-key switches and soft-key switches. Further, the switches 52 can be incorporated onto a touch screen 50 having a touch screen feature. Additionally, the terminal 46 can be a virtual terminal that is linked to a common data bus, such as CAN or SAE J1850B, where the virtual terminal gets its functional content and display content individually defined by external signal processing units, an example of which is SPU 40. In this manner, the operator terminal 46 can be a terminal that is dedicated to only the data of the seed monitoring system 36, or can be a terminal accommodating various degrees of flexibility to be used with other types of implements towed by or mounted to the tractor 10, such as sprayers, balers and harvesters.

In one embodiment, the SPU 40 is mounted at a suitable location on the seed planter 12 remotely from the sensors 38 and the seed tubes 24. The operator terminal 46 is mounted at a suitable location on the tractor 10. A connector 54 is provided to disconnect the SPU 40 from the operator terminal 46 when the seed planter 12 is disconnected from the tractor 10. The cable 48 between the SPU 40 and the operator terminal 46 can be an electrical cable or a fiber-optic cable. For those areas on the seed planter 12 in which the optical fibers 42 and 44 are exposed, and the optical cable connection between the SPU 40 and the operator terminal 46, it may be desirable to run the optical fibers 42 and 44 and the cable 48 through appropriate conduit or selected reinforced cables. Such cables are available from Poly-Optical Products, Inc., Irvine, Calif.

As will be discussed in detail below, the SPU 40 generates an optical beam that is emitted down the fiber 42 to traverse the seed tube 24. The optical beam is then collected by the fiber 44 and returned to the SPU 40 where it is converted to a square wave pulse signal indicative of the optical intensity of the beam within the seed tube 24. The seeds 18 that are dropped through the tube 24 interfere with the optical beam as it traverses the tube 24. Signal processing algorithms associated with the SPU 40 allow the system 36 to monitor and count particles and seeds of different shapes and sizes. Further, the system 36 can count several seeds or particles that pass simultaneously or partially simultaneously through the seed tubes 24. The electrical signals generated by the SPU 40 are transmitted to the operator terminal 46 where they are displayed on the screen 50. The control switches 52 allow an operator to display various outputs generated by the SPU 40 that give a physical representation of the quantity of seeds 18 being dispensed and the uniformity of the dispensing process in each of the seed tubes 24.

Figure 4:
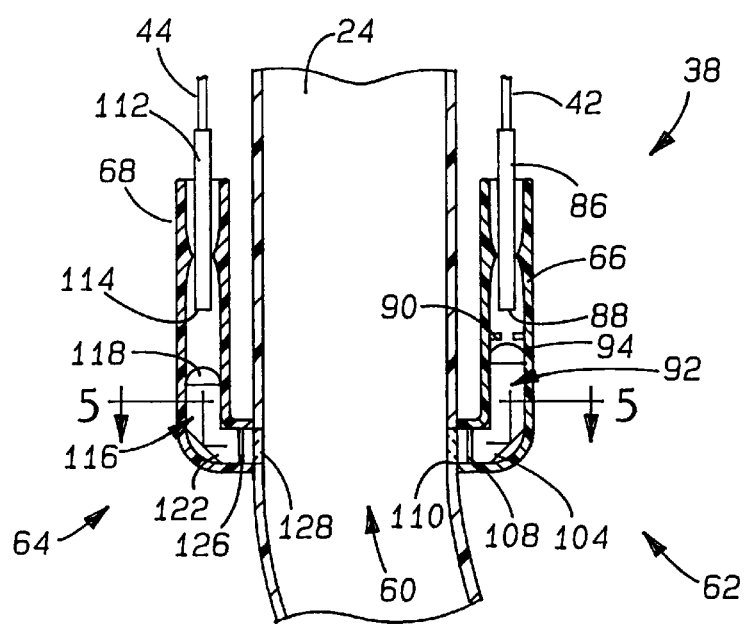
FIG. 4 is a cut-away vertical sectional view of a portion of the seed tube shown in FIG. 2 around a seed sensing area within the tube.
Figure 5:
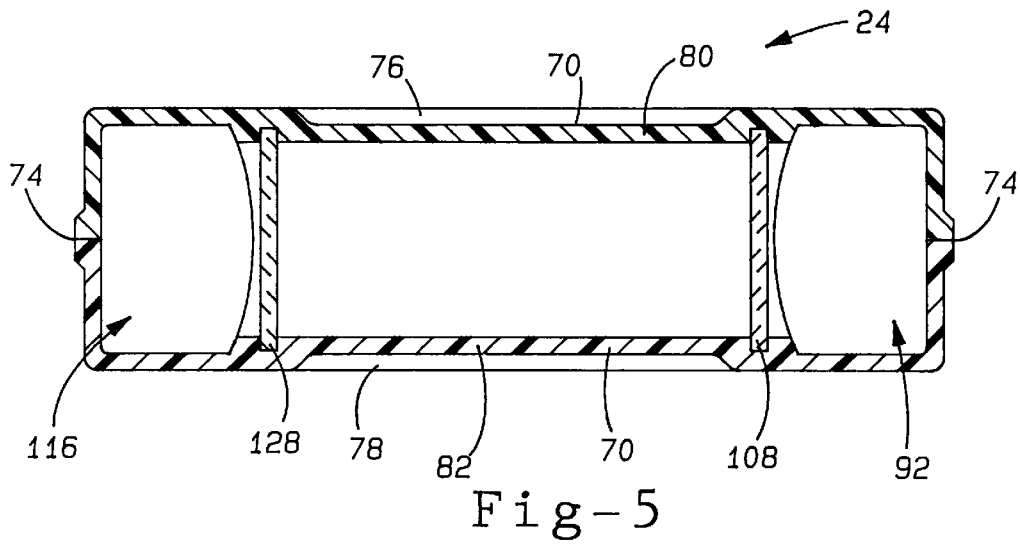
FIG. 5 is a horizontal sectional view taken along line 5—5 of FIG. 4.
Figure 6A:
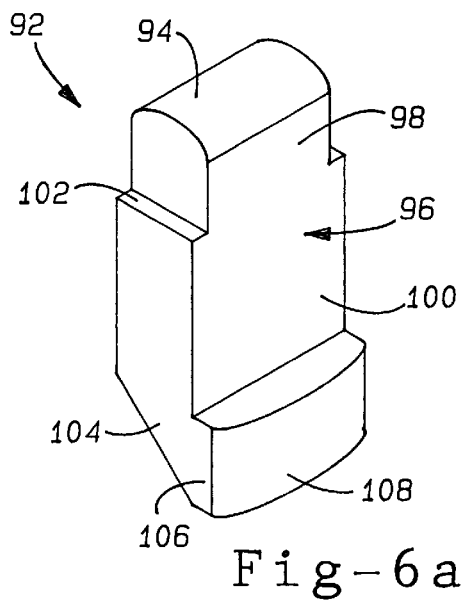
FIG. 6(a) is a perspective view of an emitter lens body used in connection with an emitter side of the seed monitoring system of the present invention.
Figure 6B:
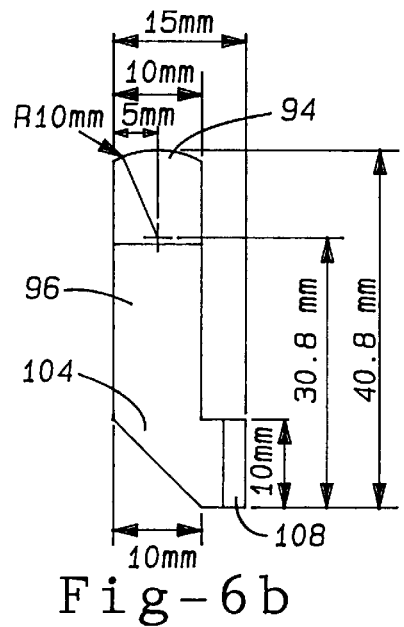
FIG. 6(b) shows a side view of the emitter lens body of FIG. 6(a)
Figure 6C:
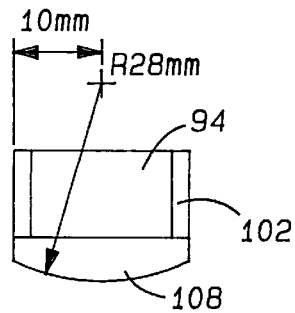
FIG. 6(c) shows a top view of the emitter lens body of FIG. 6(a)
Figure 6D:
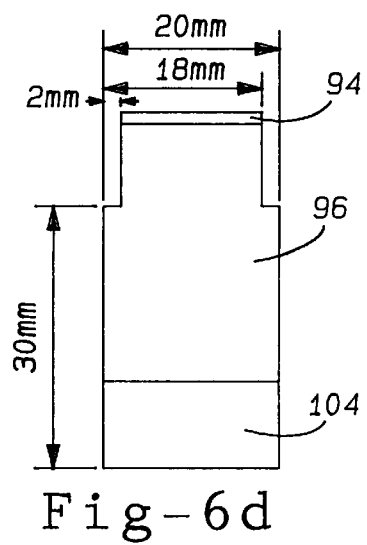
FIG. 6(d) shows a front view of the emitter lens body of FIG. 6(a)
Figure 7A:
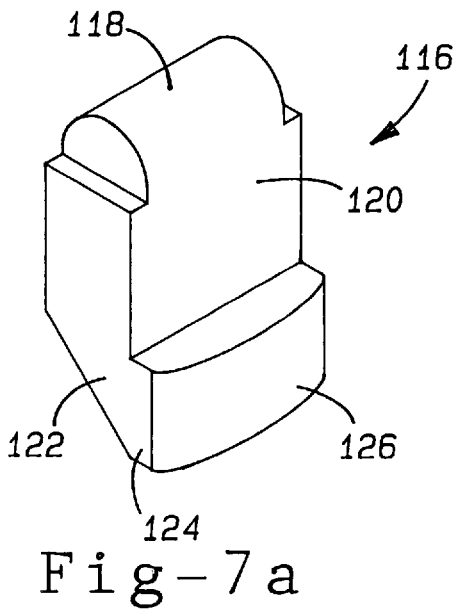
FIG. 7(a) shows a perspective view of a receiver lens body used in connection with a receiver side of the seed monitoring system of the present invention.
Figure 7B:
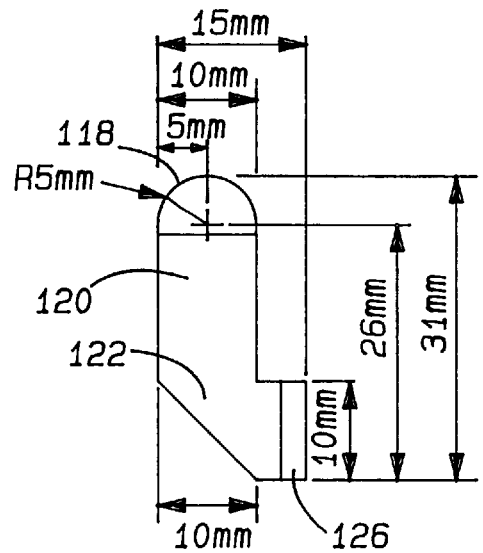
FIG. 7(b) shows a side view of the receiver lens body of FIG. 7(a)
Figure 7C:
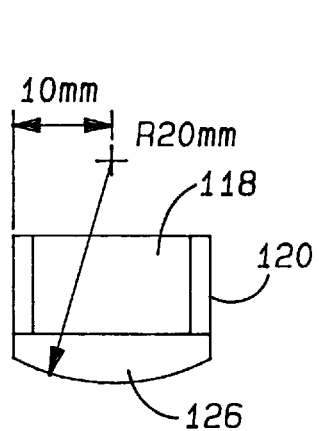
FIG. 7(c) shows a top view of the receiver lens body of FIG. 7(a)
Figure 7D:
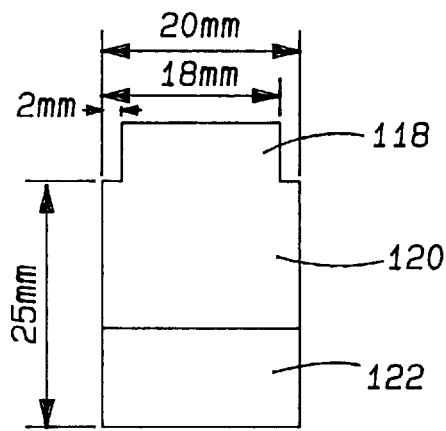
FIG. 7(d) shows a front view of the receiver lens body of FIG. 7(a)

FIG. 4 shows a vertical sectional view through the seed tube 24 around the sensor 38 at a sensing area 60. FIG. 5 shows a horizontal sectional view through the seed tube 24 along line 5—5 of FIG. 4. The sensor 38 is separated into an emitter side 62 and a receiver side 64. The emitter side 62 includes an emitter body 66 and the receiver side 64 includes a receiver body 68. In one embodiment, the emitter body 66, the receiver body 68 and the seed tube 24 are made of a plastic material and are integrally molded together. In this embodiment, the seed tube 24 includes a first half 70 and a second half 72 that are separately molded integrally with a first and second half of each of the emitter body 66 and the receiver body 68, respectively, and then are ultrasonically welded together to form a weld seam 74 between all interfacing surface features of the first half 70 and the second half 72. The different components of the emitter side 62 and the receiver side 64 that will be discussed below are placed between the first and second halves 70 and 72 of the seed tube 24 before the halves 70 and 72 are welded together. Reinforcement ribs 76 and 78 are formed in side panels 80 and 82, respectively, of the seed tube 24 for reinforcement purposes.

The optical fiber 42 is connected to the emitter body 66 by an emitter connector 86. The emitter connector 86 is locked into the emitter body 66. The optical fiber 42 includes an appropriate emitter fiber tip 88 that is suitable for the purposes described herein. Different methods are known in the art for terminating plastic optical fibers of the type described herein. In one embodiment, a hot-plate method, known to those skilled in the art, was selected as one suitable choice for terminating the fiber 42. The hot-plate technique melts and forms a polished face at the tip 88 to have an optical smooth surface finish perpendicular to the optical axis of the fiber 42. Connectors suitable for the emitter connector 86 are commercially available from different sources such as AMP Incorporated, Harrisburg, Pa., and Delphi Packard Electric. A discussion of these types of connectors can be found in several publications including the following papers: Cirillo, J. R. et al., "A Plastic Optical Fiber Termination System Designed for Automotive Manufacturing, Assembly and Service Environments," SAE Paper No. 920618, pp. 1–6; Van Woesik, Egbert T. C. M. et al., "New Design of N*N Coupler and Connectors for Plastic Optical Fibers," SAE Paper 940801, pp. 261–266; and Schreiter, Gerd et al., "New Types of Connectors for Plastic Optical Fibers for Vehicle Network Applications," SAE Paper 940799, pp. 247–251.

The emitter fiber tip 88 is positioned within the connector 86 such that the tip 88 is adjacent to an aperture 90. An emitter lens body 92 is positioned within the emitter body 66 adjacent to the aperture 90 and opposite to the fiber tip 88. FIGS. 6(a)–6(d) show a number of views of the emitter lens body 92. In one embodiment, the emitter lens body 92 is made up of a plurality of optical elements that are part of a single piece injection molded plastic structure. However, as will be appreciated by those skilled in the art, the lens body 92 can be made of separated optical structures that are cemented together by a suitable optical adhesive. Particularly, the lens body 92 includes an upper cylindrical lens 94 adjacent to the aperture 90. The lens 94 is positioned on a vertical body portion 96 that includes a narrow vertical body portion 96 and a wide vertical body portion 98 that forms a shoulder 100 therebetween. A horizontal face of a 45° prism 102 is positioned adjacent to the wide body portion 98 opposite to the lens 94. The 45° prism 102 provides an optical component for folding a radiation beam as will be discussed in greater detail below. A horizontal body portion 104 is positioned adjacent to a vertical face of the prism 102 and a lower cylindrical lens 106. In one embodiment, the emitter lens body 92 has the dimensions depicted in these figures. However, as will be appreciated by those skilled in the art, these dimensions can vary significantly without departing from the scope of the invention. An emitter lens window 108 is positioned adjacent to the lower lens 106 and the sensing area 60 so as to protect the lens body 92 from dirt and other accumulation that may enter the seed tube 24.

The optical fiber 44 is connected to the receiver body 68 by a receiver connector 112. The connector 112 is of the same type as the connector 86 above. The connector 112 is locked to the receiver body 68. The optical fiber 44 is positioned within the connector 112 such that a receiver tip 114 is formed at the end of the connector 112. A receiver lens body 116 is positioned within the receiver body 68 adjacent to the receiver tip 114, as shown. FIGS. 7(a)–7(d) show various views of the receiver lens body 116. The receiver lens body 116 is also formed of a plurality of optical elements that are part of a single piece injection molded plastic structure. Particularly, an upper cylindrical lens 118 is positioned on a vertical lens body portion 120 as shown. A horizontal face of a 45° prism 122 is positioned adjacent to the vertical lens body portion 120 opposite to the upper cylindrical lens 118. The 45° prism 122 provides a reflective surface for folding a radiation beam as will be discussed in greater detail below. A horizontal lens body portion 124 is positioned adjacent to a vertical face of the prism 122. A lower cylindrical lens 126 is positioned adjacent to the horizontal lens body portion 124 opposite to the prism 122, as shown. In one embodiment, the receiver lens body 116 includes the dimensions as shown by way of a non-limiting example. As will be appreciated by those skilled in the art, these dimensions can significantly vary from this embodiment without departing from the scope of the invention. A receiver lens window 128 is positioned within the seed tube 24 adjacent to the lower cylindrical lens 126 and the sensing area 60 so as to prevent dirt and other accumulation from entering the receiver body 68.

Figure 8:
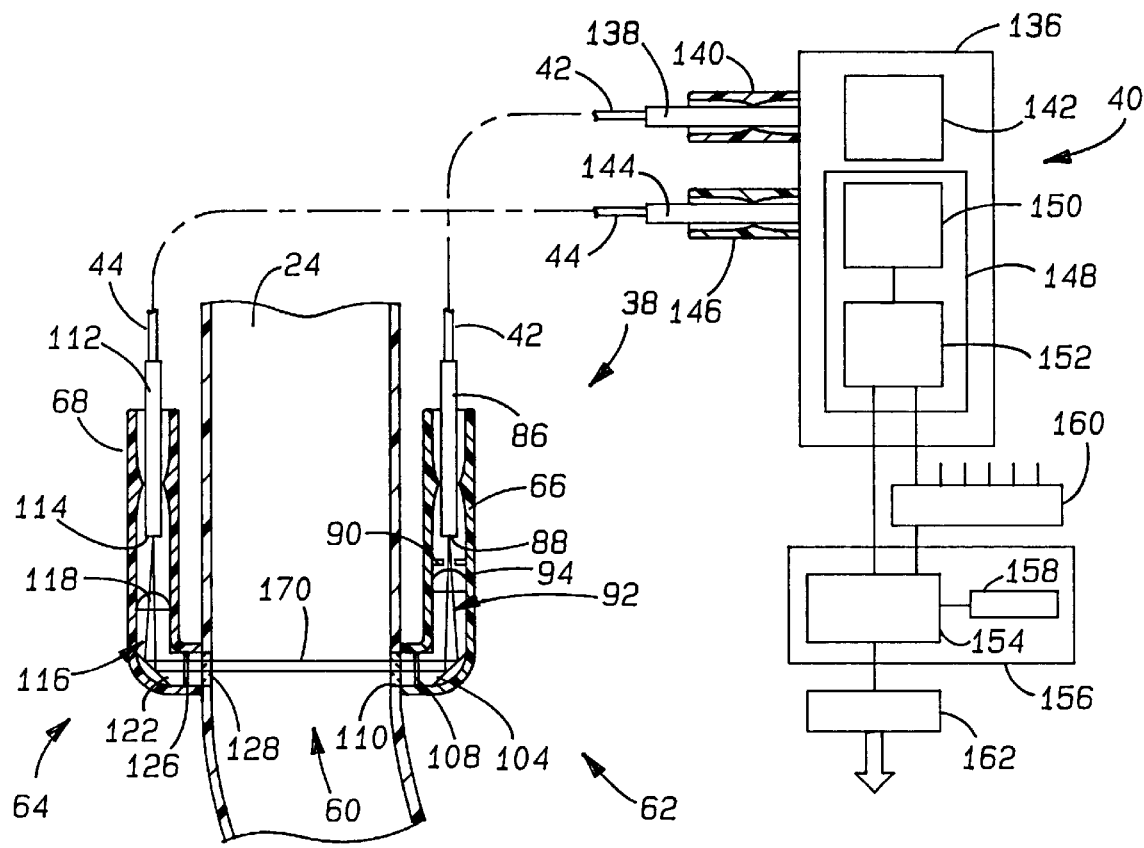
FIG. 8 shows the vertical sectional view of the seed tube as shown in FIG. 3 connected to a block diagram depiction of the sensing module that electrically monitors and counts the seeds.

FIG. 8 shows a diagram of a section of the system 36 where the sensor 38 is connected to the SPU 40 by the fiber-optic cables 42 and 44. This section of the SPU 40 shows a single sensor channel 136 of the system 36. The optical cable 42 includes an optical tip portion 138 that is secured to the sensor channel 136 by an optical fiber connector 140 relative to a radiation source 142. The radiation source 142 can be any applicable light emitting diode (LED) or laser diode suitable for the purposes described herein. The optical fiber 44 includes an optical tip portion 144 that is secured to the sensor channel 136 by an optical fiber connector 146 relative to a radiation detector 148. The radiation detector 148 includes a photodiode array 150 and a voltage/frequency converter 152. The associated connectors 140 and 146, radiation source, and detector 148 can be light-link emitters available from Siemens Corporation or the TSL230 available from Texas Instruments. The detector 148 can also be an analog type detector within the scope of the invention.

The signal output from the converter 152 of each channel is applied directly to a signal processing unit 154 of a microcontroller system 156 including a memory 158. A control line (for signal gain and sensitivity) from the converter 152 is applied to a multiplexer 160 that multiplexes all the control lines from all the different channels. An output from the multiplexer 160 is applied to the signal processing unit 154. A signal from the signal processing unit 154 is applied to the converter 152 so as to adjust the sensitivity of the detector 148 to allow for compensation for varying base line levels of radiation intensity. An output of the signal processing unit 154 is applied to a serial communication link 162 that is in connection with the monitor 46. The sensor channel 136, the microcontroller system 156, the multiplexer 160 and the link 162 would be included as part of the SPU 40 above.

Figure 10:
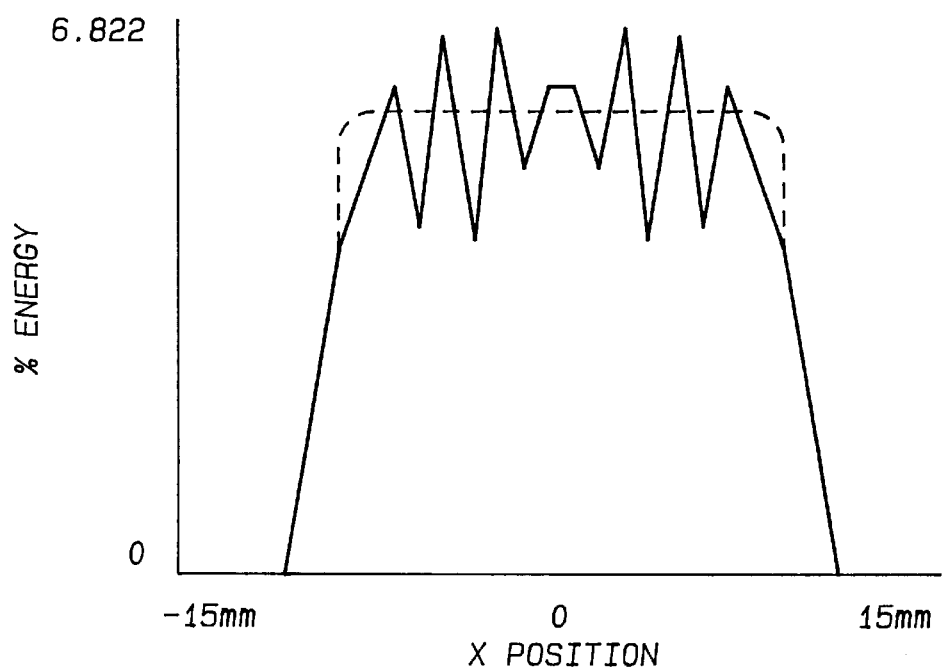
FIG. 10 shows an optical intensity graph of the optical beam of FIG. 9(a) at a region between the emitter lens body and the receiver lens body.
Figure 9A:
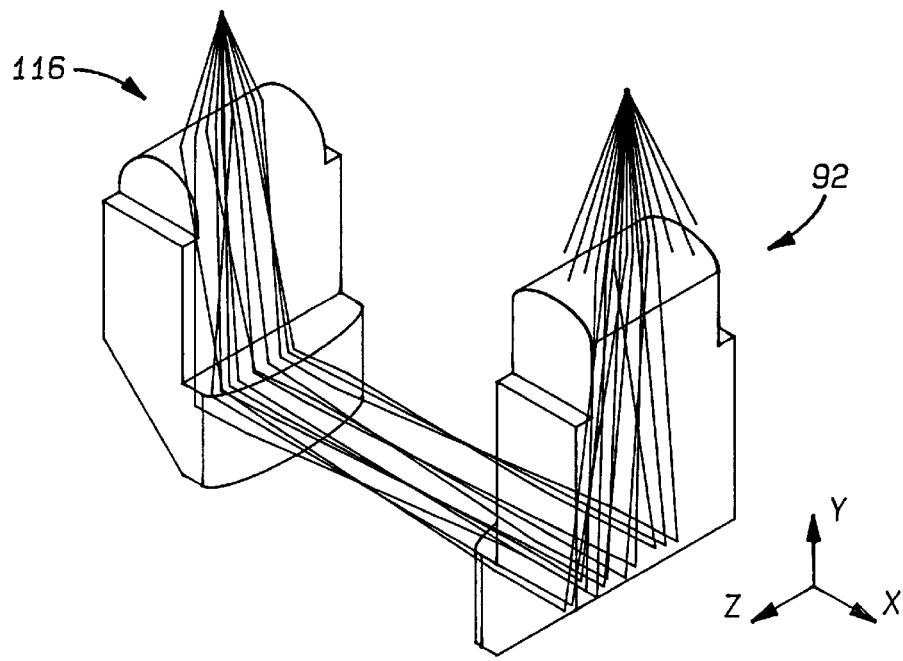
FIG. 9(a) shows a perspective view relative to an XYZ coordinate system of the rays of a radiation beam as the radiation beam propagates through an emitter lens body and a receiver lens body of the seed monitor system of the invention.
Figure 9B:
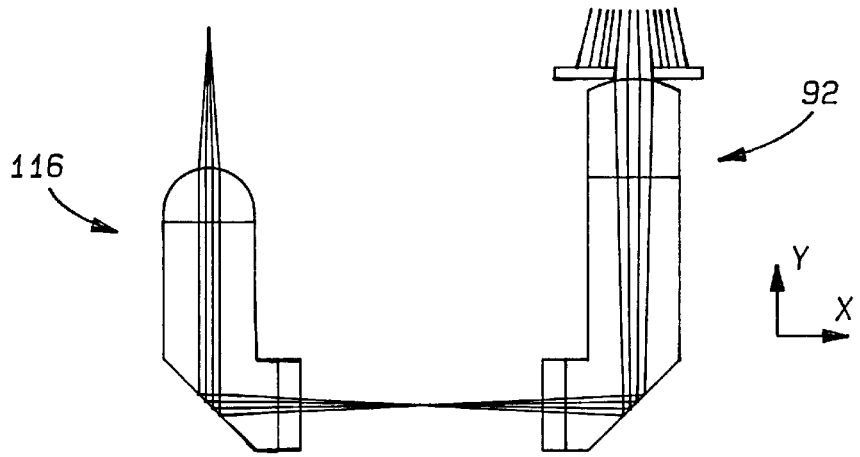
FIG. 9(b) shows a side view in the XY plane of the ray diagram of FIG. 9(a)
Figure 9C:
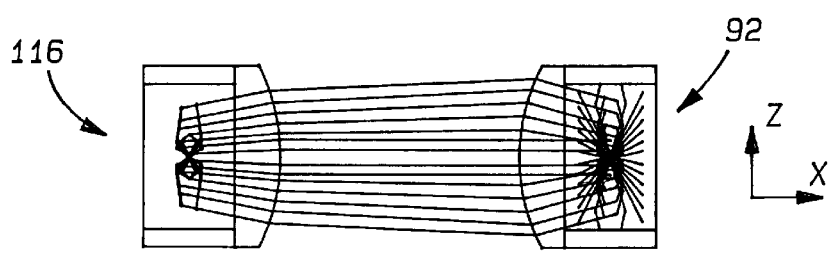
FIG. 9(c) shows a top view in the XZ plane of the ray diagram of FIG. 9(a)
Figure 9D:
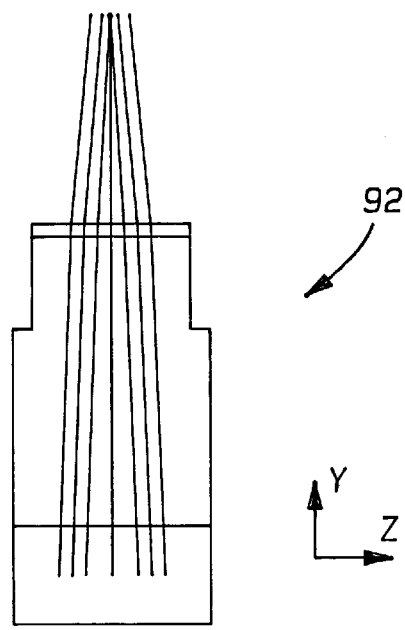
FIG. 9(d) shows a front view in the YZ plane of the emitter lens body of the ray diagram of FIG. 9(a)
Figure 9E:
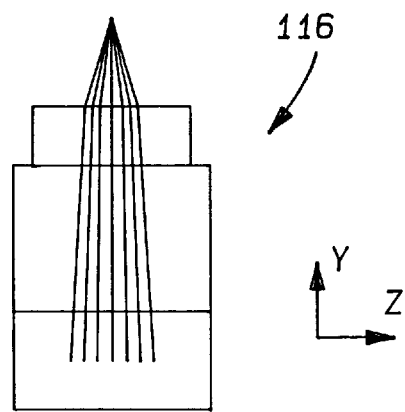
FIG. 9(e) shows a front view in the YZ plane of the receiver lens body of the ray diagram of FIG. 9(a)

A radiation beam 170 generated by the radiation source 142 is coupled into the cable 42 at the tip portion 138. In one embodiment, the radiation source 142 generates a radiation beam having a peak wavelength in the visible, infrared or near infrared region of the spectrum. Particularly, acceptable wavelengths can be 660 nm, 840 nm or between 910–940 nm. The radiation beam 170 travels through the cable 42 and is emitted from the tip 88 as a spatially non-uniform beam. FIGS. 9(a)–9(e) show various views of the rays of the radiation beam 170 with respect to an XYZ coordinate system as it travels through the emitter lens body 92 and the receiver lens body 116. The beam 170 is first shaped by the aperture 94 to provide a beam having a more uniform spatial intensity. The radiation beam 170 then enters the emitter lens body 92 through the upper cylindrical lens 94. The lens 94 substantially collimates the radiation beam 170 in the XY plane. The radiation beam 170 continues to spread non-uniformly in the YZ plane, and is then reflected 90° by the prism 102. After being reflected by the prism 102, the radiation beam 170 continues to spread until it is refracted by the lower cylindrical lens 106. The beam 170 is then comprised optimally of parallel rays that propagate across the sensing area 60 in the tube 24 to be received by the receiver lens body 116. FIG. 10 shows a graph of the energy distribution of the beam 170 in the sensing area 60. Position in the X direction is shown on the horizontal axis and percent of energy is shown on the vertical axis. The solid line of the graph of FIG. 10 results from a coarse distribution analysis using a relatively small number of discrete light rays in a light source model. In practice, the dash line represents the real energy distribution across the X-direction, assuming that an infinite number of light rays is being emitted resulting in a substantially uniform energy distribution.

The radiation beam 170 is focused by the receiver lower cylindrical lens 126 and is reflected 90° off of the prism 122. The beam 170 then impinges the upper cylindrical lens 118 and is focused and coupled into the tip 114 of the optical cable 44. The radiation beam 170 travels through the optical fiber 44 until it reaches the radiation detector 148. The radiation detector 148 has a variable radiation intensity sensitivity that allows for fluctuation in the nominal radiation intensity as defined by the intensity when no object is passing through the radiation beam 170 in the sensing area 60. The voltage/frequency converter 152 receives a voltage representation of the optical intensity of the radiation beam 170 from the photodiode array 150. The voltage/frequency converter 152 generates a square wave pulse signal where the period of the square wave is representative of the intensity of the radiation beam 170 at the photodiode array 150. The square wave pulse signal is applied to the signal processing unit 154 as a square wave input. The signal processing unit 154 measures the period of the square wave pulse signal by measuring the distance between the rising edge of each pulse. In this way, the signal processing unit 154 gives an indication of the optical intensity of the radiation beam 170 after it traverses the sensing area 60. The larger the period of the square wave pulsed signal, the lower the optical intensity of the beam 170.

Figure 12A:
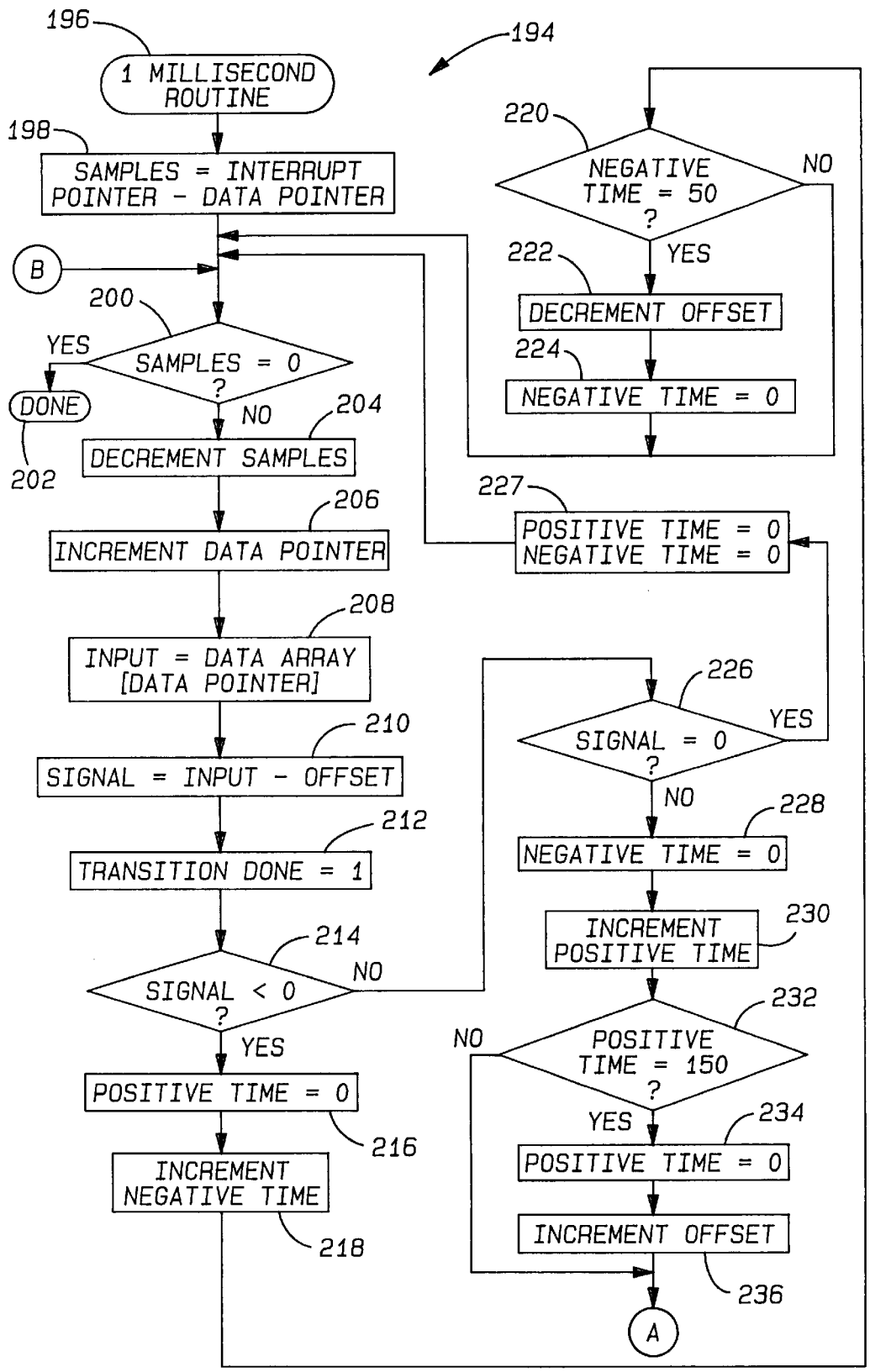
FIGS. 12A and 12B are flow chart diagrams of the overall operation of a signal processing unit of the seed monitoring system according to the invention.
Figure 12B:
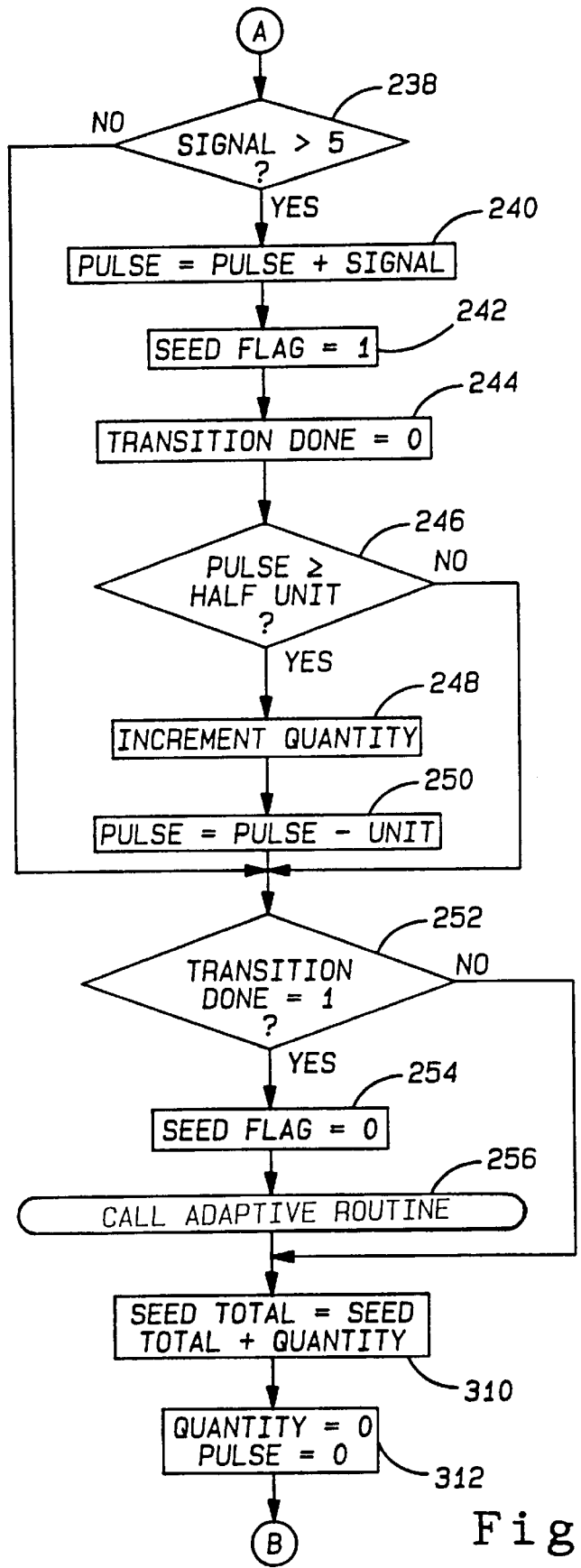
Figure 13B:
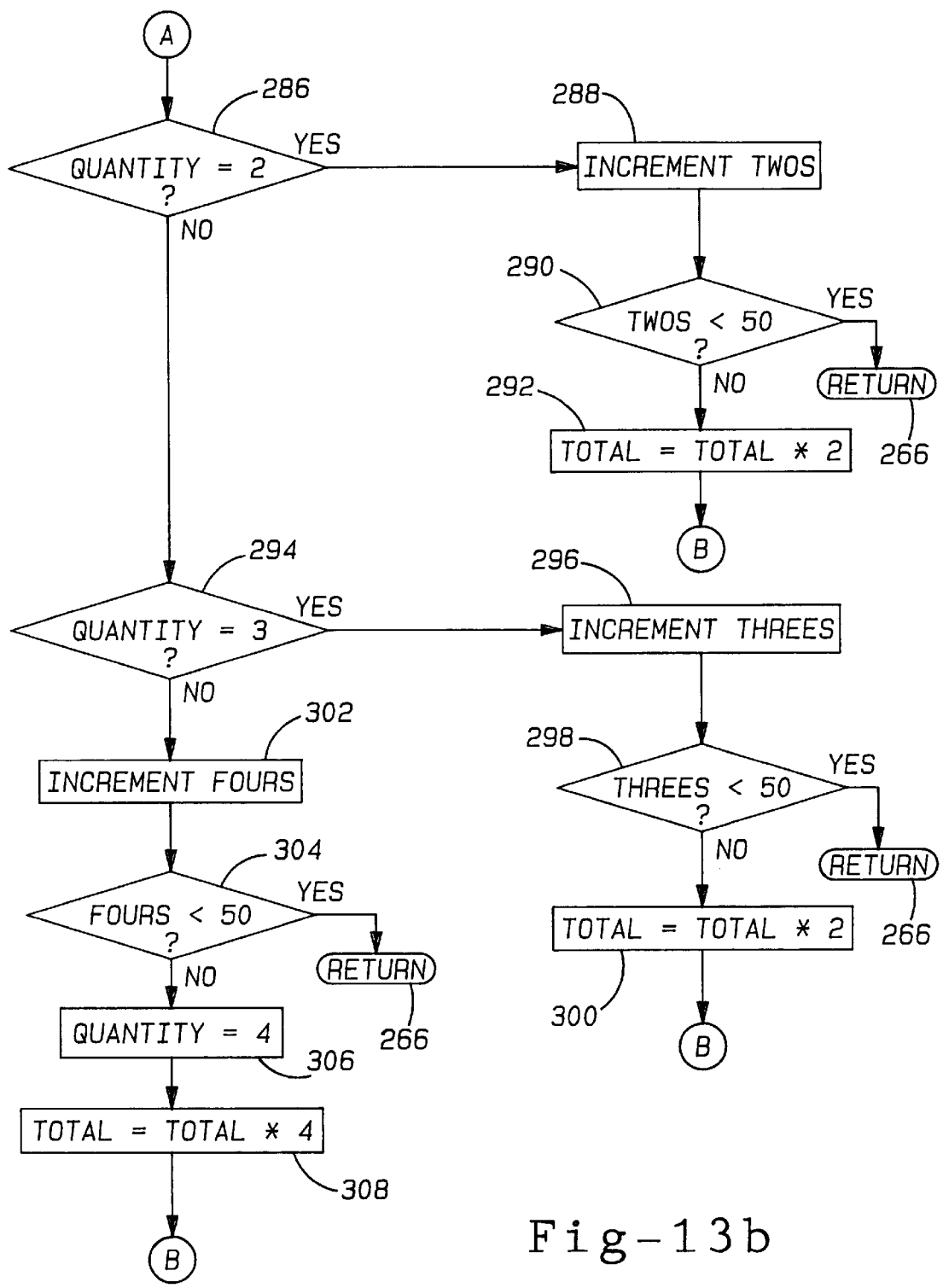

FIGS. 11–13 show functional block diagrams depicting the manner in which the signal processing unit 154 processes the information received from the detector 148. The description below of this process describes one implementation of the system 36 to detect the presence or absence of particles within the seed tube 24. However, as will be appreciated by those skilled in the art, this process can be readily modified to sense the size of a particle given its velocity, or the velocity of the particle given its size. Also, the process can be further modified so that the frequency of, and the time between, subsequent particles passing the sensing area 40 can be determined.

An overview of the process performed by the signal processing unit 154 for counting the seeds 18 as they pass through the radiation beam 170 in the sensing area 60 will be given first. As mentioned above, light intensity of the radiation beam 170 is converted to a square wave pulse signal by the detector 148. The period of the pulse signal is inversely proportional to light intensity. The period of the square wave pulse signal is measured by an input capture peripheral within the signal processing unit 154. Data sampling is therefore done asynchronously, depending entirely on the frequency of the square wave pulse signal. The signal processing unit 154 can control the sensitivity of the detector 148, and can appropriately scale the frequency of the square wave pulse signal. For example, the sensitivity of the detector 148 can be increased such that sufficient information is gathered for each particle transition through the sensing area 60, and decreased so that the data samples are non-redundant. In one embodiment, the signal processing unit 154 adjusts the frequency of the pulsed signal between 4 kHz and 20 kHz. However, the signal processing unit 154 can adjust the frequency of the pulse signal to different ranges depending on specific applications. Because the input capture peripheral is interrupt driven, i.e., asynchronous, data collection is separated from the signal evaluation. The signal processing is done synchronously, for example once per millisecond, to evaluate the data samples accumulated in that time frame.

The software within the signal processing unit 154 begins by establishing a base line period measurement. This base line period, referred to as an offset variable, is the period of the square wave pulse signal corresponding to no particles or seeds 18 passing through the radiation beam 170 at the sensing area 60. Deviations from the offset variable indicate obstructions in the radiation plane that lower the light intensity of the radiation beam 170. As the light intensity is diminished by the particles or seeds 18 traversing the radiation beam 170 in the sensing areas 60, the deviation of the period measurements from the offset variable is accumulated as a pulse variable. The pulse variable is then compared to a unit variable representing an average value associated with one particle or seed 18 traversing the radiation beam 170 for a particular seed shape and size.

If the pulse variable reaches half of the unit variable, the signal processing unit 154 counts a particle. The value of the unit variable is then subtracted from the pulse variable, making the pulse variable negative. If only one particle is traversing the radiation beam 170, further accumulation of the deviations from the offset variable will bring the pulse variable back near zero. If multiple particles are passing through the radiation beam 170, the pulse variable will continue to increase until another particle is counted and the unit variable will again be subtracted from the pulse variable. This process continues until the value of a signal variable returns to the value of the offset variable. The samples variable is a loop counter calculated once per time period as the difference between an interrupt pointer and a data pointer. The interrupt pointer is an index into a data array buffer that is advanced by each new data sample. The data array buffer is a circular buffer that contains the raw data period measurements. The data array is a circular buffer in that the address locations of data array wrap around such that after the last register location is filled, the next register location to be filled is the first register location. The data array buffer can be included in the on-board random access memory of the signal processing unit 154. The data pointer is an index into the data array buffer that points to the sample being currently evaluated. Filtering is done on the offset variable and the unit variable to adapt to different levels of light intensities and different particle sizes, respectively.

FIG. 11 shows a flow chart diagram 180 of a data collection routine setting out the process by which the microcontroller system 156 fills the data array buffer with samples. The data collection routine is interrupt driven in that the time of each period of the square wave pulse signal is recorded. In the step of box 184, a new time stamp variable is defined as an input capture function. The length of the period is then determined by subtracting a previous time stamp variable from the new time stamp variable. The period is saved in the data array buffer at the step of box 186. The new time stamp variable is then saved as an old time stamp variable in the step of box 188. The interrupt pointer that establishes the address location where the next data sample is to be stored in the data array is incremented in the step of box 190. The periods of the square wave pulse signal are continually stored in the data array in this manner. In one embodiment, the data array buffer includes 256 sample locations that store the last 256 consecutive periods of the pulse signal for data analysis.

FIG. 12 shows a flow chart diagram 194 depicting the data analysis operation of the data stored in the data array buffer. In one embodiment, the data analysis sequence is performed in one millisecond as a one millisecond routine 196. Of course, other time intervals may be equally applicable for different applications. The process of the flow chart diagram 194 begins by initializing all the variables that are defined for the process. The number of samples stored in the data array buffer is determined by subtracting the data pointer from the interrupt pointer, and storing the result as the variable samples as depicted in the step of box 198. The system 156 then begins a loop to evaluate the samples until no new data remain. The loop starts at the step of decision diamond 200 where the system 156 determines if the samples variable equals zero. If the samples variable does equal zero, then the process is finished at the step of box 202.

If the samples variable does not equal zero, then the system 156 decrements the samples variable at the step of box 204. The data pointer is incremented at the step of box 206. Then, the system 156 defines an input variable that receives the value in the data array buffer at the index location of the data pointer at the step of box 208. At the step of box 210, the signal variable is determined as the difference between the input variable and the offset variable. The offset variable is the base line value of the data in the data array buffer, i.e., the period measurement when no seed is traversing the sensing area 60. Next, the system 156 sets a transition done variable equal to one at the step of box 212. The transition done variable is a boolean variable set at the start of the process for each sample, and is cleared if it is later learned that a particle is still in transition in the radiation beam 170.

The offset variable is filtered by evaluating the signal variable by first determining if the signal variable is less than zero at the step of box 214. If the signal variable is less than zero, then the process defines a positive time variable as zero at the step of box 216. The positive time variable is the number of consecutive period measurements that are greater than the offset variable. Next, a negative time variable is incremented by one at the step of box 218. The process then determines if the negative time variable is equal to fifty at the step of decision diamond 220. The negative time variable is the number of consecutive period measurements that are less than the offset variable. The value fifty is used in this specific embodiment as an example, and as such can be any appropriate value for other specific applications within the scope of the invention. If the negative time variable does not equal fifty, then the system 156 returns to the step of box 200 to determine if the samples variable equals zero. If, however, the negative time variable does equal fifty, then the system 156 decrements the offset variable at the step of box 222, sets the negative time variable to zero at the step of box 224, and then returns to the step of determining if the samples variable equals zero at the step of box 200.

If the signal variable is not less than zero at the step of decision diamond 214, then the system 156 determines if the signal variable equals zero at the step of decision diamond 226. If the signal variable does not equal zero, then the system 156 sets the negative time variable to zero at the step of box 228, and increments the positive time variable at the step of box 230. The system 156 then determines if the positive time variable is equal to one hundred and fifty at the decision diamond 232. The value of one hundred and fifty is used by way of a non-limiting example in that other values for the positive time variable can be equally applicable for different applications within the scope of the present invention. If the positive time variable does equal one hundred and fifty, then the system 156 sets the positive time variable equal to zero at the step of 234, and increments the offset variable at the step of 236. In this manner, if the negative time variable reaches fifty, then the offset variable is decremented, and if the positive time variable reaches one hundred fifty, then the offset variable is incremented. If the signal variable is zero at the step of decision diamond 226, then the positive and negative time variables are both reset to zero and the process returns to the step of diamond 20.

If the positive time variable does not equal one hundred and fifty at the step of decision diamond 232, or the system 156 increments the offset variable at the step of box 236, the system 156 then determines if the signal variable is greater than a threshold value at the step of decision diamond 238. In this example, the threshold value is set to be five, however, this threshold value is used as a non-limiting example in that other threshold values for different applications would be equally applicable without departing from the scope of the invention. If the signal variable is greater than the threshold value, then the system 156 adds the signal variable to an integration variable pulse at the step of box 240. The integration variable pulse is the accumulation of all of the signal variables that are greater than the threshold. The system 156 then sets a seed flag to one and the transition done flag to zero at the steps of boxes 242 and 244, respectively. The seed flag is a boolean variable that is set each time a signal is found to be greater than five (the value of five being used by way of a non-limiting example), and is cleared when it is later found that the seed transition through the radiation beam 170 is finished.

The pulse signal is then evaluated to count the number of particles traversing the sensing area 60. Each time the pulse variable exceeds half of the unit variable at the step of decision diamond 246, another particle is detected and a quantity variable is incremented at the step of box 248. The unit variable is then subtracted from the pulse variable at the step of box 250. The unit variable is a value representing the average size of a pulse created by a particle passing through the sensing area 60. Next, the system 156 determines if the transition done variable is equal to one at the decision diamond 252. If the transition done variable is equal to one, then the system 156 sets the seed flag to zero at the step of 254.

The unit variable is then filtered by an adaptive routine subroutine 256. FIG. 13 shows a flow chart diagram 258 of the adaptive routine subroutine 256. The filtering process first determines if a quantity variable is equal to zero at the step of decision diamond 260. The quantity variable is the number of particles or seeds 18 counted in the current pulse variable.

If the quantity variable is equal to zero, then the system 156 will increment a zeros register at the step of box 262. The zeros register stores the number of particles which pass through the radiation beam 170, but did not accumulate a large enough value in the pulse variable to be considered a whole particle to be counted. Likewise, a ones register stores the number of particles counted as one discrete particle, a twos register stores the number of particle clusters passing through the radiation beam 170 that are counted as two particles, a threes register stores the number of particle clusters that pass through the radiation beam that are counted as three particles, and a fours register stores the number of particle clusters passing through the radiation beam 170 that are counted as four or more particles. Of course, the system 156 can be tailored to include other registers that store the number of particles passing through the radiation beam as more than four particles, or can be tailored to reduce the number of registers to one, two or three. The system 156 will then determine if the zeros register is less than fifty. If the zeros register is less than fifty, then the system 156 returns to the main routine at the step of box 266. If, however, the zeros register is not less than fifty, then a total variable is set to the previous total variable divided by two at the step of box 268. The total variable is a filter variable that includes the unit variable and a fractional value. The system 156 will then set all of the zeros-fours registers to zero at the step of box 270.

If the quantity variable does not equal zero at the decision diamond 260, then the system 156 determines if the quantity variable equals one at decision diamond 276. If the quantity variable does equal one, then the system 156 sets a new total variable equal to the past total variable plus the pulse variable at box 278. The system then increments the ones register at the step of box 280. The system 156 then determines if the ones register is less than fifty at decision diamond 282. If the ones register is not less than fifty, then the system 156 sets the ones register, the zeros register, the twos register, the threes register, and the fours register to zero at the step of box 270.

After these registers are set to zero, or the ones register is less than fifty, the process sets the unit variable equal to the total variable at the step of box 272. The process will then set the half unit variable equal to the unit variable divided by two at the step of box 274, and will then return to the main process at the step of box 266.

If the quantity variable does not equal one at the step of decision diamond 276, then the system 156 determines if the quantity variable is equal to two at decision diamond 286. If the quantity variable is equal to two, then the system 156 increments the twos register at the step of box 288. The system 156 then determines if the twos register is less than fifty at the decision diamond 290. If the twos register is less than fifty, then the system 156 returns to the process at the step of box 266. If, however, the twos register is not less than fifty, then the system 156 sets the total variable equal to the previous total variable times two at the step of box 292. The system 156 then returns to the box of setting the zeros through fours registers equal to zero at the step of box 270.

If the system 156 determines that the quantity variable does not equal two at the step of decision diamond 286, the system 156 will determine if the quantity variable equals three at the step of decision diamond 294. If the quantity variable does equal three at the decision diamond 294, then the system 156 will increment the threes register at the step of box 296. The system 156 will determine if the threes register is less than fifty at the decision diamond 298. If the threes register is less than fifty, then the system 156 returns to the process of the main algorithm at the step of box 266. If, however, the threes register is not less than fifty, then the system 156 multiplies the current total variable by two to get a new total variable at the step of box 300. The system 156 then returns to the step of setting the zeros through fours registers to zero at the step of box 270.

If the system 156 determines that the quantity variable does not equal three at the decision diamond 294, the system 156 increments the fours register at the step of box 302. The system 156 then determines if the fours register is less than fifty at the decision diamond 304. If the fours register is less than fifty, then the system 156 returns to the main process at the box 266. If, however, the fours register is not less than fifty, the system 156 will set the quantity variable equal to four and determine a new total variable as the previous past total variable times four at the step of box 308. The system 156 will then return to the step of setting the zeros through fours registers to zero at the step of box 270.

After the filtering process of the total adjustment routine at box 256 or the transition done flag does not equal zero at the decision diamond 256, the system 156 will set a new seed total variable as the previous seed total variable plus the quantity variable at the step of box 310. The system 156 will then set the quantity variable and the pulse variable equal to zero at the step of box 312. The system 156 will then return to the loop to determine if the samples variable is equal to zero at the decision diamond 200.

The above-described seed monitoring system and its operation can be extended to monitoring seed flow and counting seeds in air seeding systems, known to those skilled in the art. FIG. 14 shows a side view of a tractor 320 intended to represent various types of farm tractors that perform various tasks in a high volume agricultural environment as may be present on a farm. In the depiction of FIG. 14, the tractor 320 is towing an air seeding system 322, including a tool bar 324 and an air cart 326, by a tow bar 328. The air seeding system 322 can be any known air seeding system in the art, such as the 730 Air Disk Drill, 735 Air Seeder and 737 Air Hoe Drill, all available from the John Deere Company. The tool bar 324 creates multiple parallel furrows in the soil of a field area to be planted, dispenses a controlled quantity of spaced apart seeds into the furrows, and then covers the furrows in a manner that allows the seeds to germinate and then become plants. Known air seeding systems of the type of the air seeding system 322 can simultaneously plant up to ninety-six rows of seeds. The configuration of the tool bar 324 and the air cart 322 can be reversed in that the tractor can tow the air cart 326 and the air cart 326 can tow the tool bar 324.

FIG. 15 shows a cut-away side view of a portion of the air seeding system 322. The air cart 326 includes a hopper 330 that holds a quantity of a particulate matter to be dispensed by the air seeding system 322. The hopper 330 can hold any particle suitable for the purposes described herein, such as various grains, seeds, fertilizers, herbicides, etc. For the purposes of describing the present discussion, the air seeding system 320 will be described as dispensing seeds 332 of any suitable type. The flow of seeds 332 from the hopper 330 is controlled by a rotary metering system 334. The controlled flow of seeds 332 from the metering system 334 distributes the seeds 332 into a primary manifold 336 through a suitable conduit 338. A plurality of primary seed tubes 340, one of which is shown in FIG. 15, are connected to the primary manifold 336 to receive the flow of seeds 332 from the hopper 330. For the embodiment of the air seeding system that seeds ninety-six rows, there would be eight primary seed tubes 340.

A fan 342 is connected to the primary manifold 336 by a hose 344. The fan 342 provides air pressure to the primary manifold 336 so as to cause the seeds 332 to move through the primary manifold 336 into the primary seed tubes 340 under air pressure. Each primary seed tube 340 is connected to a separate secondary manifold 346. A plurality of secondary seed tubes 348 are connected to each of the secondary manifolds 346. In the embodiment being discussed herein, there are twelve secondary seed tubes 348 connected to each secondary manifold 346. Each secondary seed tube 348 is connected to an opener 350. The opener 350 is a blade device that creates furrows in the soil being planted from the motion of the tool bar 324 such that the seeds 332 are dispensed from the opener 350 at the appropriate depth into the soil. Ground closers 352 then close the furrows to cover the seeds with soil.

A primary seed sensor 360 is seed tube 340 at primary seed tube 340 at any appropriate location to monitor the flow of seeds 332 through the primary seed tubes 340 to ensure that the seeding system 322 is dispensing seeds as intended. Likewise, a secondary seed sensor 362 is attached to each secondary seed tube 348 to monitor the seed flow through the secondary seed tubes 348. In one embodiment, only the primary seed sensors 360 are used so as to provide a measurement and quantification of the seed flow in the air seeding system 322 that reduces the total number of sensor sites so as to provide a cost effective system that allows total seed counting capabilities. Alternately, the primary seed sensors 360 can be eliminated, and only the secondary seed sensors 362 would be used. As will be described in detail below, the primary seed sensor 360 and the secondary seed sensors 362 include various optical emitters and receivers, and associated fiberoptical cables to monitor the flow of seeds through the primary seed tubes 340 and the secondary seed tubes 348.

The seed monitoring system 36, discussed above, can be modified to be used in the air seeding system 322. In this alternate embodiment, as shown in FIG. 16, each of a plurality of the secondary seed sensors 362 are connected to the SPU 40 by a transmitting optical fiber 370 and a detecting optical fiber 372. Because of the diameter of typical known primary seed tubes, in one embodiment, the primary seed sensor 360 will include four separate emitting lens bodies and four separate receiving lens bodies. Therefore, the primary seed sensor 360 includes four transmitting optical fibers 374 and four receiving optical fibers 376. Of course, the actual workable embodiment will have all of the necessary primary sensors 360 and secondary sensors 362 attached to the SPU 40.

Figure 17:
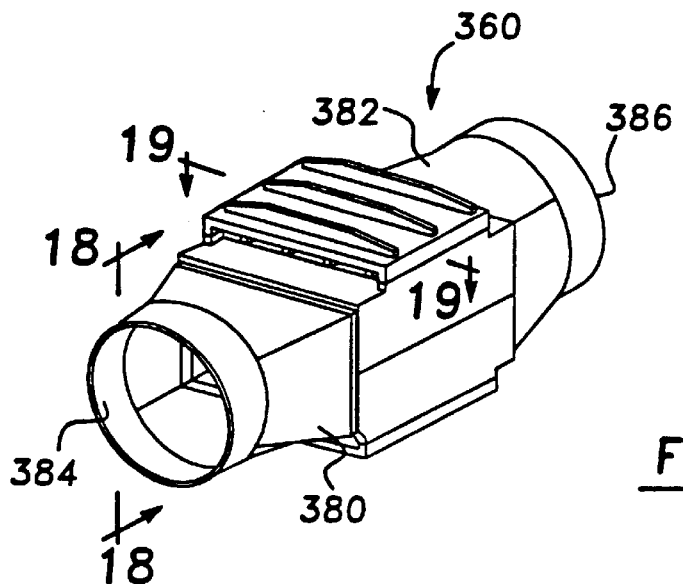
FIG. 17 is a perspective view of a primary sensor of FIG. 16 separated from a primary seed tube.

FIG. 17 shows a perspective view of the primary sensor 360 separated from the primary seed tube 340. The primary sensor 360 defines a plastic housing member formed from a first housing half 380 and a second housing half 382. In one embodiment, the first and second housing halves 380 and 382 are separately molded, and then later secured together by ultrasonic welding, glue or the like. The first and second housing halves 380 and 382 have the shape as shown in order to conform with the primary seed tube 340 in an efficient manner. Of course, other shapes may be equally effective. The primary sensor 360 includes openings 384 and 386 at each end in order to accept the primary seed tube 340. The primary seed tube 340 is attached to the primary seed sensor 360 by any suitable mechanism, such as hose clamps, glue, etc.

Figure 18:
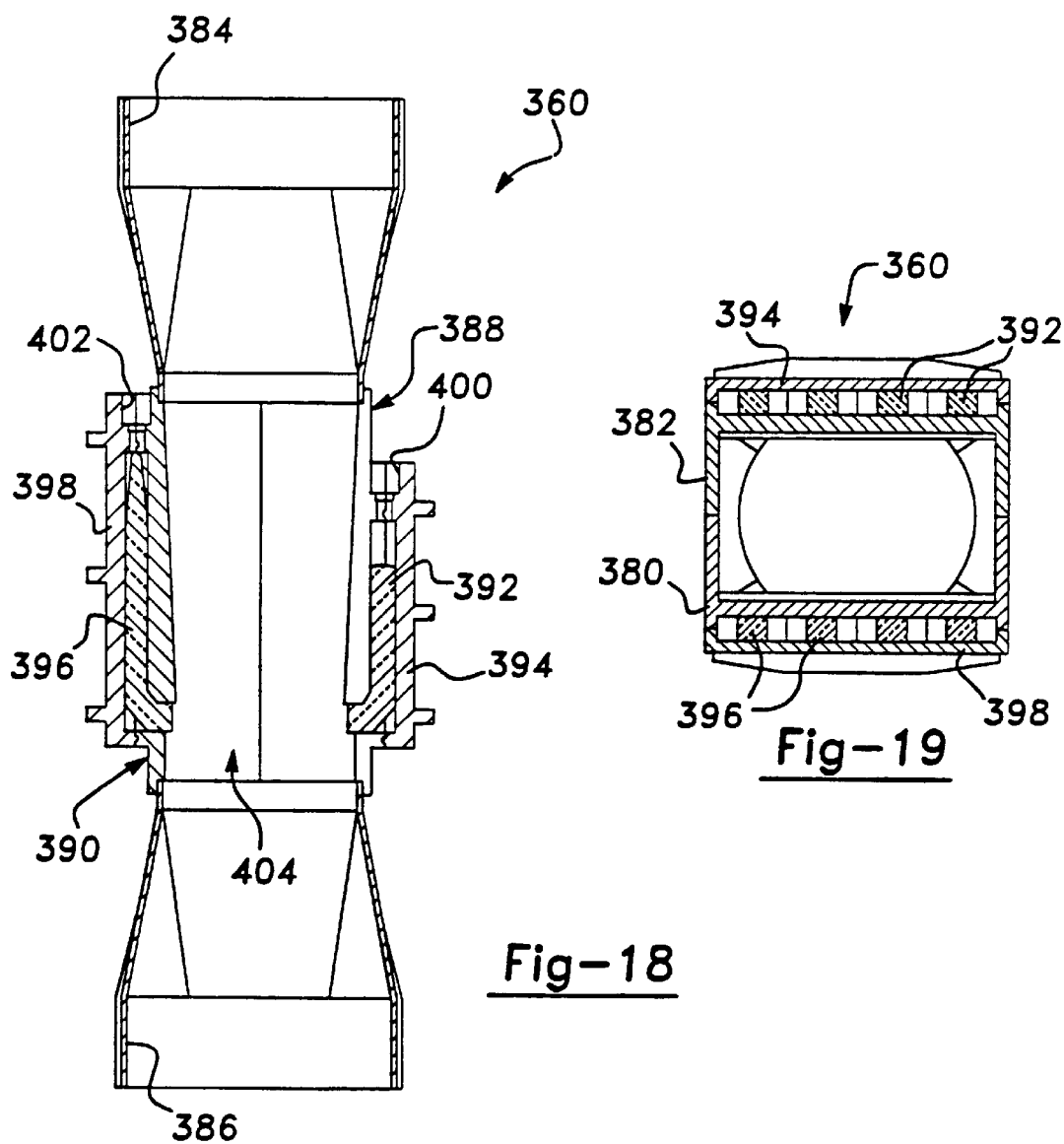
FIG. 18 is a sectional view of the primary sensor along line 18—18 that exposes an emitter lens body and a receiver lens body within the primary sensor.

A cross-sectional side view through line 18—18 of the primary seed sensor 360 is depicted in FIG. 18 to show a separation of the primary sensor 360 into an emitter side 388 and a receiver side 390. The emitter side 388 includes an emitter lens body 392 secured within an emitter housing 394. Likewise, the receiver side 390 includes a receiver lens body 396 secured within a receiver housing 398. The emitter housing 394 includes an opening 400 formed to accept a transmission optical fiber (not shown) and the receiver housing 398 includes an opening 402 configured to accept a receiver optical fiber (not shown). An optical beam received by the emitter lens body 392 from the transmitting optical fiber is transmitted across a sensing area 404 to be received by the receiver lens body 396. The light received by the receiver lens body 396 is then transmitted by the receiver optical fiber back to the SPU 40, as discussed above. The operation of the primary sensor 360 is similar to the operation of the sensor 38.

Figure 19:
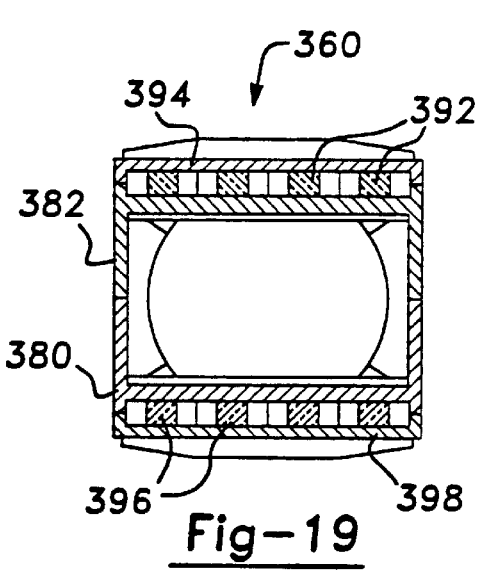
FIG. 19 is a cut-away view along line 19—19 of the primary sensor.
Figure 20A:
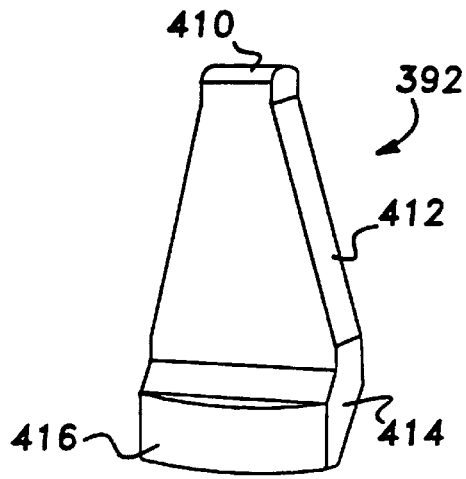
FIGS. 20(A–D) are perspective views of the emitter lens body of the primary sensor.
Figure 20B:
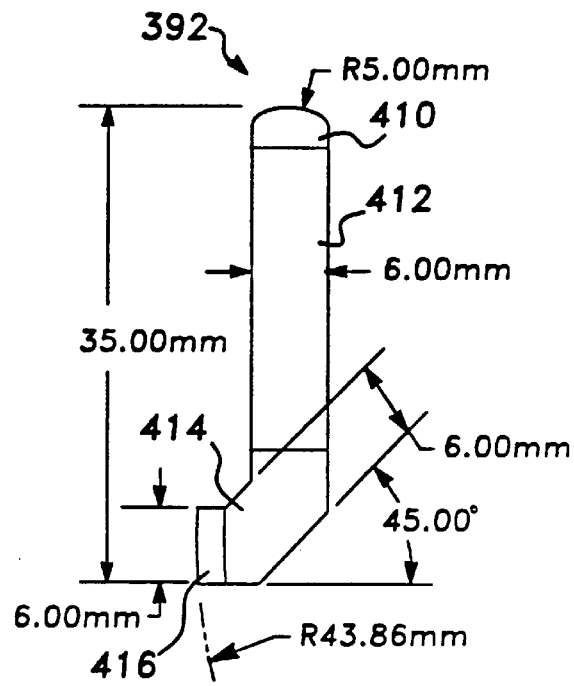
Figure 20C:
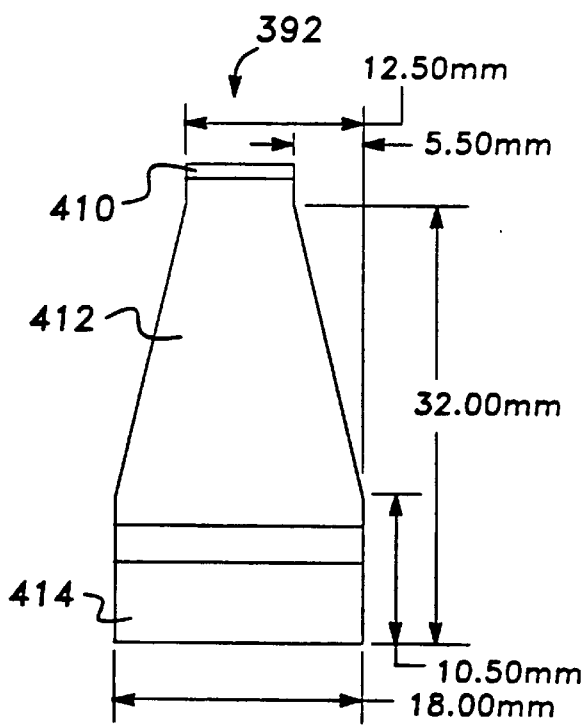
Figure 20D:
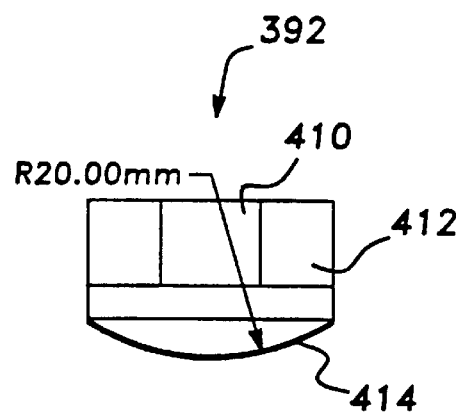
Figure 21A:
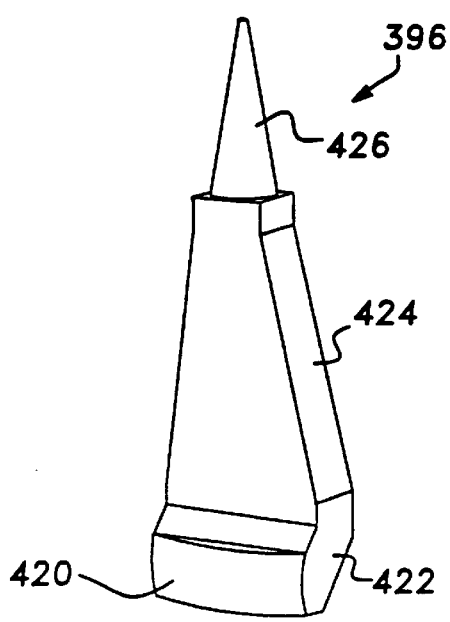
FIGS. 21(A–D) are perspective views of the receiver lens body of the primary sensor.
Figure 21B:
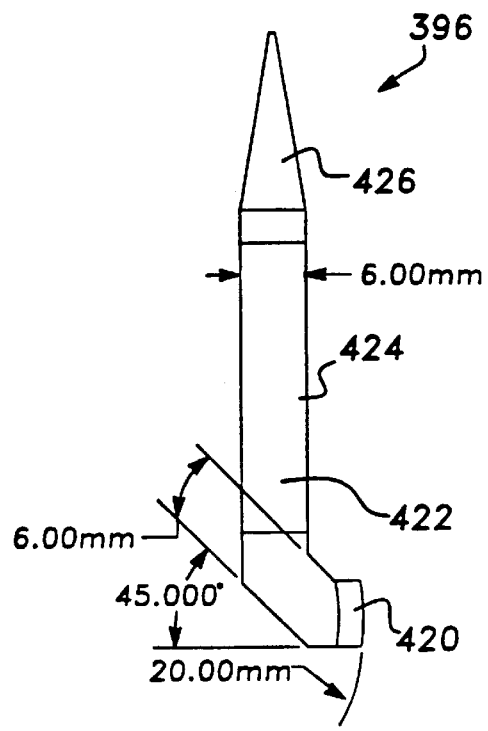
Figure 21C:
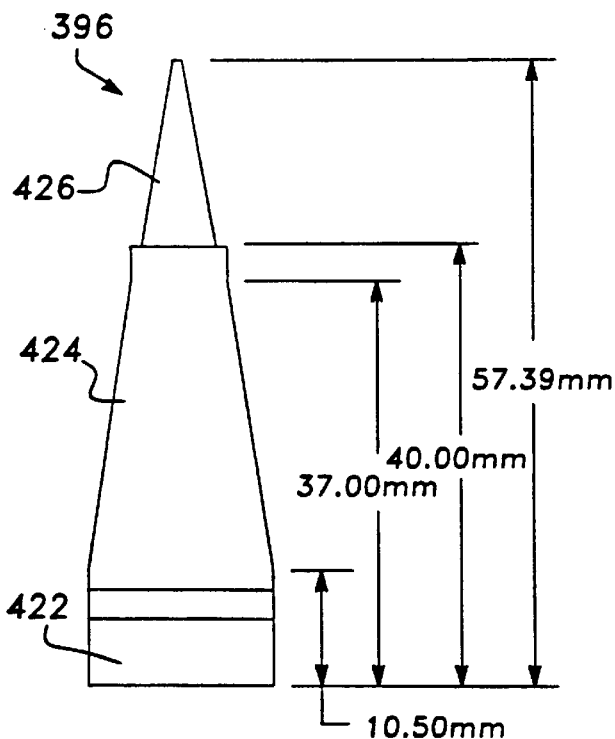
Figure 21D:
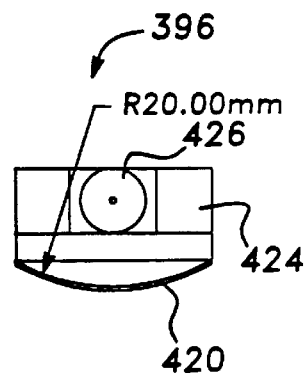

FIG. 19 shows a cross-sectional view of the primary sensor 360 through line 19—19. Because the primary seed tube 340 must provide a larger volume of seeds to provide the necessary seed flow to the secondary seed tubes 348, the diameter of the primary seed tube 340 must be relatively large. Therefore, according to an embodiment of the present invention, the primary sensor 360 includes four emitter lens bodies 392 and four receiver lens bodies 396 within the emitter housing 394 and the receiver housing 398, respectfully. Of course, more or less emitter lenses and receiver lens bodies can be used depending on the sensitivity desired and the size of the seed tube used.

FIGS. 20(a)–20(d) show a number of views of the emitter lens body 392. Particularly, the emitter lens body 392 includes an upper cylindrical lens 410 positioned on a triangular shaped vertical body portion 412. A 45° prism 414, acting as folding optics, is connected to the vertical body portion 412 and an aspherical lens 416 as shown. In one embodiment, the emitter lens body 392 has the dimensions depicted in these figures. However, as will be appreciated by those skilled in the art, these dimensions can vary without departing from the scope of the invention. Optical radiation that enters the upper cylindrical lens 410 is then emitted out of the aspherical lens 416 to cross the sensing area 404 as a substantially collimated, spatially uniform optical beam.

FIGS. 21(a)–21(d) show various views of the receiver lens body 396. Light traveling across the sensing area 404 is received by a spherical lens 420, and is folded by a 45° prism 422 to be directed into a triangular shaped vertical body portion 424. The light transmitting through the vertical body portion 424 enters a light concentrator 426 that concentrates the light into a narrow region to be sent through the receiving optical fiber. In one embodiment, the receiver lens body 396 has the dimensions depicted in these figures, however, as will be appreciated by those skilled in the art, these dimensions can vary without departing from the scope of the invention. The light rays traveling across the sensing area 404 have a spatial uniformity in the same manner as the light rays discussed above. The different combination of spherical, aspherical and cylindrical lenses for the emitter lens body 392 and the receiver lens body 396 are shown by way of a non-limiting example, in that other lens shapes may be applicable within the scope of the present invention.

Figure 22:
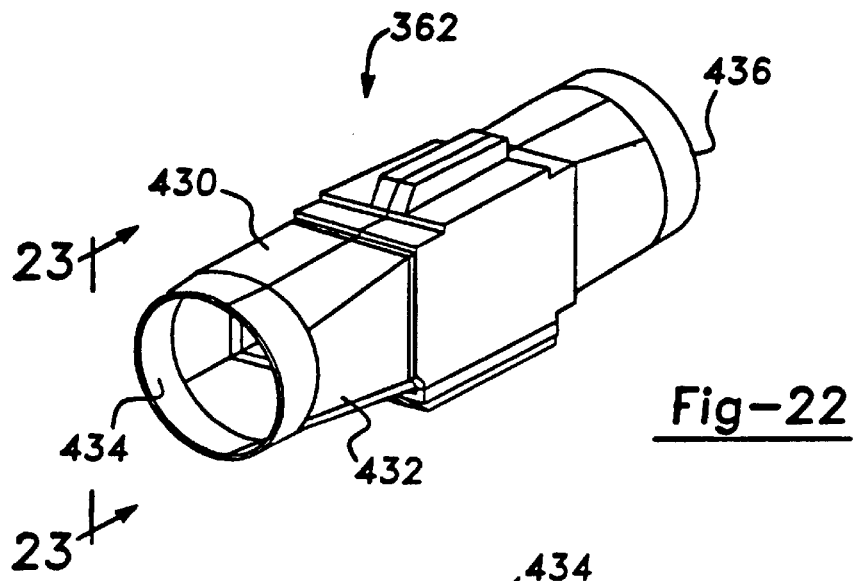
FIG. 22 is a perspective view of a secondary sensor of the invention.

FIG. 22 shows a perspective view of the secondary sensor 362, according to one embodiment of the present invention. The secondary sensor 362 is also a plastic body formed of a first housing half 430 and a second housing half 432 that have been injection molded and attached together by ultrasonic welding or the like. The secondary sensor 362 includes openings 434 and 436 at each end in order to accept the secondary seed tube 348. The secondary seed tube 348 is attached to the secondary seed sensor 362 by any suitable mechanism, such as hose clamps, glue, etc. The secondary sensor has the shape as shown to conform to the secondary seed tubes 348. However, as will be appreciated by those skilled in the art, other suitable shapes can be used within the scope of the invention.

Figure 23:
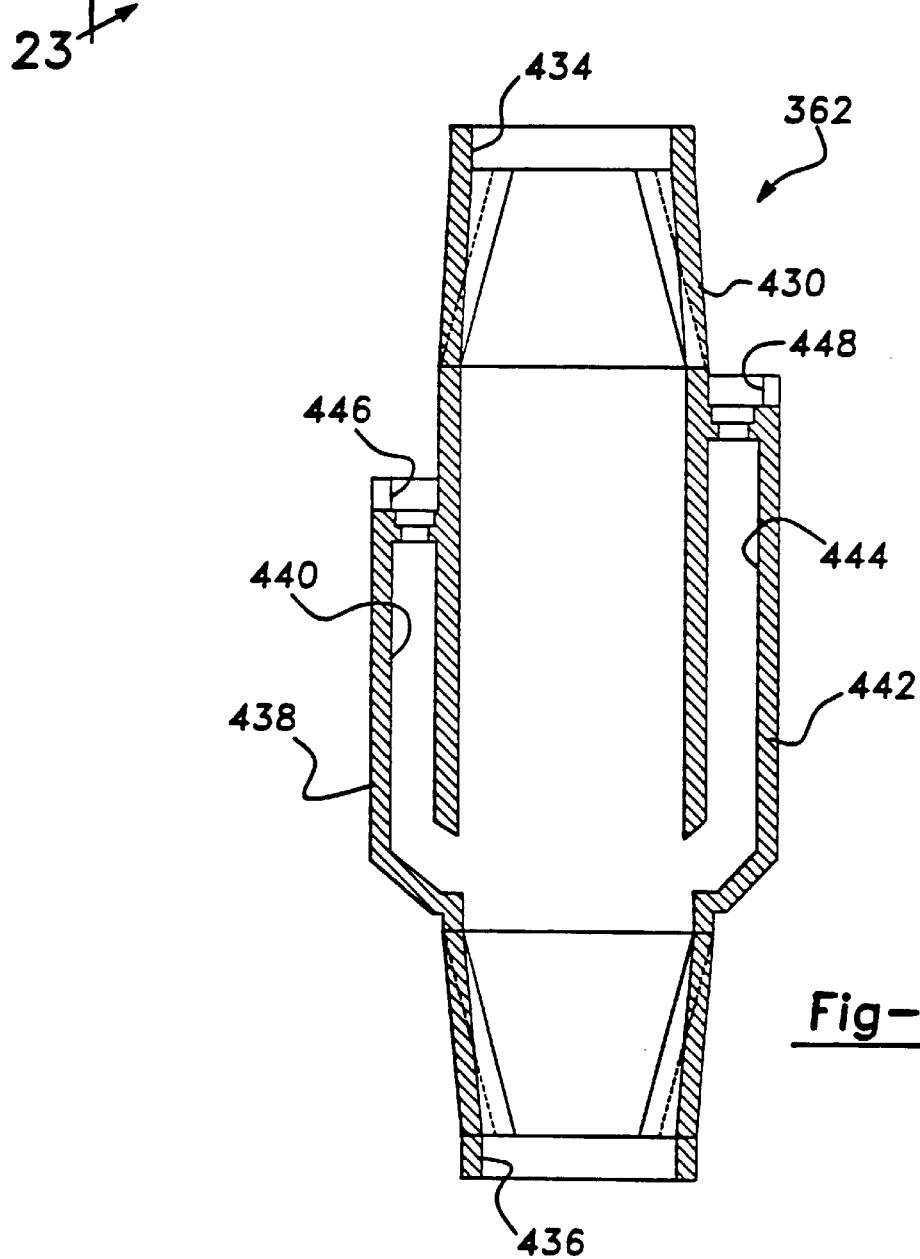
FIG. 23 is a cut-away side view of the secondary sensor of FIG. 21.

FIG. 23 shows a cross-sectional side view of the first half 430 of the sensor 362. In this view, the emitter lens body and the receiver lens body have been removed, but it will be appreciated by those skilled in the art that the emitter lens body 392 and the receiver lens body 396 discussed above are applicable for the secondary sensor 362. The secondary sensor 362 includes an emitter housing 438 including an emitter lens cavity 440 that accepts the emitter lens body. Likewise, the sensor 362 includes a receiver lens housing 442 that includes a receiver lens cavity 444 for receiving the receiver lens body. Also, the emitter lens housing 438 includes an opening 446 for positioning a transmitting fiberoptic cable, and the receiver lens housing 442 includes an opening 448 for positioning a detecting fiberoptic cable. The operation of the secondary sensor 362 is the same as above, however, only a single emitter lens body and receiver lens body is necessary because of the smaller diameter of the secondary seed tube 348.

The technique described above for transmitting and analyzing optical pulses to detect and count particles in the seed monitoring system 36 is applicable to be used with the primary seed sensor 360 and the secondary seed sensor 362 in the air seeding system 322.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A particle flow monitoring system for counting a plurality of particles as they pass through a sensing area of an air seeding system, said air seeding system including a plurality of primary particle tubes that receive a flow of particles from a hopper, each of said primary particle tubes being connected to a plurality of secondary particle tubes through a manifold where each of the secondary particle tubes receive a flow of particles from a primary particle tube under air pressure from a fan, said secondary particle tubes dispensing the particles, said particle flow monitoring system comprising:

at least one primary particle sensor attached to at least one of the plurality of primary particle tubes at a location suitable to detect particle flow through the primary particle tube, said primary sensor including at least one emitter lens body responsive to an optical sensing beam and directing the optical sensing beam across the primary particle sensor through a sensing area, and at least one receiver lens body positioned in an opposing relationship to the emitter lens body and being responsive to the optical beam from the emitter lens body, wherein the intensity of the optical beam received by the receiving lens body provides a signal to be used by the monitoring system to determine the count of particles passing through the sensing area in the primary particle tube.

2. The system according to claim 1 wherein each of the primary particle tubes includes a primary sensor having an emitter lens body and a receiver lens body.

3. The system according to claim 1 wherein at least one of the secondary particle tubes includes a secondary particle sensor having an emitter lens body and a receiver lens body.

4. The system according to claim 3 wherein each of the secondary particle tubes includes a secondary particle sensor having an emitter lens body and a receiver lens body.

5. The system according to claim 1 wherein the emitter lens body includes a cylindrical lens, a 45° prism and an aspherical lens, said cylindrical lens being responsive to the optical beam, said prism being responsive to the optical beam from the first cylindrical lens and reflecting the optical beam substantially 90°, and said aspherical lens being responsive to the optical beam from the prism so as to direct the optical beam through the sensing area.

6. The system according to claim 1 wherein the receiver lens body includes a spherical lens, a 45° prism and a beam concentrator, said spherical lens being responsive to the optical beam from the sensing area, said 45° prism being responsive to the optical beam from the spherical lens and reflecting it substantially 90°, and said beam concentrator being responsive to the optical beam from the prism.

7. The system according to claim 1 further comprising processing means for processing the signal indicative of the optical beam intensity from the receiver lens body, said processing means including means for providing an indication of the flow of particles passing through the sensing area where the particles vary in size and shape.

8. The system according to claim 1 further comprising a transmission optical fiber for transmitting the optical sensing beam to the emitter lens body from a remote optical source, and a receiving optical fiber for transmitting the optical sensing signal from the receiver lens body to a remote optical beam detector.

9. The system according to claim 1 wherein the particles are seeds.

10. The system according to claim 1 wherein the emitter lens body and the receiver lens body are positioned and secured within a single plastic housing.

11. The system according to claim 1 wherein the at least one primary particle sensor includes four emitter lens bodies and four receiver lens bodies.

12. The system according to claim 1 wherein the optical sensing beam is optically altered by the at least one emitter lens body so that it is substantially collimated and is spatially uniform across the entire width of the sensing area.

13. An air seeding system for dispensing particles at a plurality of locations, said system comprising:
    a hopper, said hopper storing a quantity of the particles;
    a plurality of primary particle tubes, each of said primary particle tubes receiving a controlled quantity of particles from the hopper;
    a plurality of secondary particle tubes, wherein some of the plurality of secondary particle tubes are connected to each of the primary particle tubes by a separate manifold so as to receive a controlled flow of particles from the primary particle tube;
    a fan, said fan providing air pressure to cause the particles to flow through the primary particles tubes and the secondary particle tubes;
    a primary particle sensor attached to at least one of the plurality of primary particle tubes at a location suitable to detect particle flow through the primary particle tube, said primary sensor including at least one emitter lens body responsive to an optical sensing beam and directing the optical sensing beam across the primary particle tube through a sensing area, and at least one receiver lens body positioned in an opposing relationship to the emitter lens body and being responsive to the optical beam from the emitter lens body;
    a beam generating device, said beam generating device generating the optical sensing beam;
    at least one transmitting optical fiber transmitting the optical sensing beam from the beam generating device to the emitter lens body, said beam generating device being positioned remotely from the primary particle sensor;
    a beam detecting device, said beam detecting device detecting the optical sensing beam from the receiver lens body;
    a receiver optical fiber transmitting the optical sensing beam from the receiver lens body to the beam detecting device, said beam detecting device being positioned remotely from the primary particle tube; and
    a monitoring device, said monitoring device monitoring a signal indicative of the intensity of the optical beam from the beam detecting device, said monitoring device generating a signal indicative of the number of particles passing through the sensing area in the primary particle tube.

14. The system according to claim 13 wherein at least one of the secondary particle tubes includes a secondary particle sensor having an emitter lens body and a receiver lens body.

15. The system according to claim 14 wherein each of the secondary particle tubes includes a secondary particle sensor having an emitter lens body and a receiver lens body.

16. The system according to claim 13 wherein the emitter lens body includes a cylindrical lens, a 45° prism and an aspherical lens, said cylindrical lens being responsive to the optical beam, said prism being responsive to the optical beam from the first cylindrical lens and reflecting the optical beam substantially 90°, and said aspherical lens being responsive to the optical beam from the prism so as to direct the optical beam through the sensing area.

17. The system according to claim 13 wherein the receiver lens body includes a spherical lens, a 45° prism and a beam concentrator, said spherical lens being responsive to the optical beam from the sensing area, said 45° prism being responsive to the optical beam from the spherical lens and reflecting it substantially 90°, and said beam concentrator being responsive to the optical beam from the prism.

18. The system according to claim 13 wherein the particles are seeds.

19. The system according to claim 13 wherein each of the primary particle tubes includes a primary sensor having at least one emitter lens body and at least one receiver lens body.

20. The system according to claim 13 wherein the optical sensing beam is optically altered by the at least one emitter lens body so that it is substantially collimated and is spatially uniform across the entire width of the sensing area.

21. A method of monitoring particle flow through an air seeding system, said method comprising the steps of:
    dispensing the particles through a plurality of primary particle tubes from a hopper;
    dispensing a flow of particles from each primary particle tube into a plurality of secondary particle tubes under air pressure from a fan;
    providing at least one primary particle sensor attached to at least one of the primary particle tubes at a location suitable to detect particle flow through the primary particle tube, said step of providing a particle sensor including the steps of providing a primary particle sensor including at least one emitter lens body responsive to an optical sensing beam and at least one receiver lens body positioned in an opposing relationship to the emitter lens body, said at least one receiver lens body being responsive to the optical beam from the emitter lens body; and
    transmitting the optical sensing beam to the at least one emitter lens body so as to direct the optical beam across a sensing area between the at least one emitter lens body and the at least one receiver lens body in the primary particle tube, wherein the intensity of the optical beam received by the receiver lens body is used by the air seeding system to determine the count of particles flowing through the primary particle tube.

22. The method according to claim 21 wherein each of the primary particle tubes includes a primary sensor having at least one emitter lens body and at least one receiver lens body.

23. The method according to claim 21 wherein the step of transmitting the optical sensing beam includes transmitting the optical sensing beam from the at least one emitter lens body to the at least one receiver lens body such that the optical sensing beam is substantially collimated and is substantially spatially uniform across the sensing area.

24. A seed monitoring system for counting a plurality of seeds as they pass through a sensing area of an air seeding system, said air seeding system including a plurality of primary seed tubes that receive a flow of the seeds from a hopper, each of said primary particle tubes being connected to a plurality of secondary seed tubes through a manifold where each of the secondary seed tubes receive a flow of the seeds from a primary seed tube under air pressure from a fan, said secondary seed tubes dispensing the seeds, said seed monitoring system comprising:

a seed sensor attached to at least one of the plurality of primary seed tubes at a location suitable to detect the seed flow through the primary seed tube, said primary sensor including at least one emitter lens body responsive to an optical sensing beam and directing the optical sensing beam across the primary seed sensor through a sensing area, and at least one receiver lens body positioned in an opposing relationship to the emitter lens body and being responsive to the optical beam from the emitter lens body, wherein the intensity of the optical beam received by the receiving lens body provides a signal to be used by the monitoring system to determine the count of seeds passing through the primary seed tube, and wherein the optical sensing beam is optically altered by the at least one emitter lens body so that it is substantially collimated and is spatially uniform across the entire width of the sensing area.

* * * * *